United States Patent
Redfern

[19]

[11] Patent Number: 6,078,914
[45] Date of Patent: Jun. 20, 2000

[54] NATURAL LANGUAGE META-SEARCH SYSTEM AND METHOD

[75] Inventor: Darren M. Redfern, Stratford, Canada

[73] Assignee: Open Text Corporation, Canada

[21] Appl. No.: 08/769,929

[22] Filed: Dec. 9, 1996

[51] Int. Cl.[7] .................................................. G06F 17/30
[52] U.S. Cl. ............................ 707/3; 707/2; 707/4; 707/5
[58] Field of Search .................................. 707/2, 3, 4, 5, 707/1

[56] References Cited

U.S. PATENT DOCUMENTS

| | | | |
|---|---|---|---|
| 5,278,980 | 1/1994 | Pedersen et al. | 707/4 |
| 5,500,920 | 3/1996 | Kupiec | 395/2.79 |
| 5,576,954 | 11/1996 | Driscoll | 707/3 |
| 5,640,553 | 6/1997 | Schultz | 707/5 |
| 5,642,502 | 6/1997 | Driscoll | 707/5 |

FOREIGN PATENT DOCUMENTS

| | | | |
|---|---|---|---|
| 0597630 | 5/1994 | European Pat. Off. | G06F 15/403 |
| 0638870 | 2/1995 | European Pat. Off. | G06F 17/30 |
| 2296799 | 7/1996 | United Kingdom | G06F 17/30 |
| 90/08360 | 7/1990 | WIPO | G06F 15/403 |
| WO 95/12173 | 5/1995 | WIPO | G06F 17/30 |

OTHER PUBLICATIONS

"Navigating With A Web Compass", R. Baldazo, vol. 21, No. 3, Mar. 1, 1996.

"Alephweb: A Search Engine Based On The Federated Structure", Proc. 7th Joint European Networking Conference, May 13–16, 1996, Bupadest.

DataBase Inspec Instruction of Electrical Engineers, Stevenage, GB, see Abstract, Dec. 1996.

*Primary Examiner*—Thomas G. Black
*Assistant Examiner*—Donald Min
*Attorney, Agent, or Firm*—Fitzpatrick, Cella, Harper & Scinto

[57] ABSTRACT

A meta search system accepts natural language queries which are parsed to extract relevant content, this relevant content being formed into queries suitable for each of a selected number of search engines and being transmitted thereto. The results from the search engines are received and examined and a selected number of the information sources represented therein are obtained. These obtained information sources are then examined to rank their relevance to the extracted relevant content and the portions of interest in each of these ranked information sources are determined. The determined portions are output to the user in ranked order, having first been processed to clean up the portions to include valid formatting and complete paragraphs and/or sentences.

13 Claims, 16 Drawing Sheets

NATURAL LANGUAGE META-SEARCH SYSTEM AND METHOD

FIELD OF THE INVENTION

The present invention relates to a system and method of processing queries for information. More specifically, the present invention relates to a meta-search system and method for accepting a natural language query which is processed to retrieve information from one or more information sources via at least one search engine and to extract relevant portions of those information sources for output to the originator of the query.

BACKGROUND OF THE INVENTION

Systems and methods for locating information in databases are known. An area in which such systems and methods have recently become quite common and heavily used is in searching for information on the World Wide Web (WWW) and/or on other internet sources.

Typically, an internet user will access a search engine, such as AltaVista or Yahoo through a web page maintained for that purpose by the host of the search engine and will input search data relating to the information sought into the search engine. The search data can, for example, comprise keywords or phrases related to the information sought and boolean operators to further qualify the search. Examples of such search data are, "AZT and Toxicity", wherein AZT is one keyword, Toxicity is another and the 'and' is boolean operator requiring both keywords to be present in the information source for it to be considered a match.

Once search data is input, the search engine then consults one or more indices it maintains of web pages or other information sources that match the search data. A listing of the information sources that match the search data, often referred to as "hits", is then displayed to the user, the number of matches usually being limited to some predefined maximum number. These matches are typically ranked, usually according to the number of occurrences of keywords or phrases in the information source. Generally, the information which is displayed to the user for each match comprises a location at which the document can be accessed (a URL for a WWW document) and some minimal additional information such as a document title, etc.

Generally, such search engines provide a skilled user with reasonable results from well defined and/or homogeneous databases or other information sources. For example, the APS U.S. Patent database can be efficiently searched based on the contents of well-defined information fields, such as Patent Number, inventor Name, etc. to locate information sought.

However, while such search engines can generally provide a skilled user with reasonable results from such well defined and/or homogeneous databases, they do suffer from disadvantages. Specifically, when searching databases or information sources which are not homogeneous or well defined, such as the WWW and/or internet, even the best formed search strategy can result in a hundred or more matches, many of which are not useful to the user but which must still be reviewed by the user, to at least some extent, to determine this. Further, such search engines generally require the user to understand and be comfortable with boolean type searches and are limited to this type of search operation.

To enhance the chances that the desired information will in fact be located, a user will often perform the same search on multiple search engines thus exacerbating the number of matches which must be reviewed by the user. The use of more than one search engine can also require the user to redraft his search data to accommodate different search data requirements and/or capabilities of the different search engines. For example, some search engines may only allow keyword-based searches while others may permit searching based upon phrases.

These difficulties often result in the less skilled user not obtaining acceptable search results without multiple and/or recursive search attempts, which has led many users to adopt the interactive search technique commonly referred to as, "surfing the web" which, while often entertaining and/or informative, can be time consuming and may still not locate the desired information.

Natural Language Query (NLQ) systems are also known and are used for a variety of purposes. Generally, a NLQ system accepts a search sentence or phrase in common everyday (natural) language and parses the input sentence or phrase in an attempt to extract meaning from it. For example, a natural language search phrase used with a company's financial database may be "Give me a list of the fourth quarter general ledger expense accounts." This sentence will be processed by the NLQ system to determine the information required by the user which is then retrieved from the financial database as necessary. However, such NLQ systems are computationally expensive to operate as the processing required to determine the meaning of a sentence or phrase is significant. Further, such systems are generally limited in terms of the scope of the information which they can access. For example, a different NLQ system is likely required to correctly process queries relating to a company's financial information than is required to search a medical database of obscure diseases. Also, such NLQ systems generally only produce acceptable results with well defined and/or homogeneous databases.

It is desired to have a meta-search engine which will accept natural language search data to search for information from one or more information sources which need not be homogeneous or well defined, the meta-search engine would identify portions of the matching information which it determines to be relevant to the search data and would display at least those determined portions to the user.

SUMMARY OF THE INVENTION

It is an object of the present invention to provide a novel meta-search system and method for obtaining information relevant to a natural language query from a plurality of information sources which obviates or mitigates at least one disadvantage of the prior art.

According to a first aspect of the present invention, there is provided a method of locating information in at least one information source, comprising the steps of:

(i) accepting a natural language query describing desired information;

(ii) parsing said natural language query to extract terms relevant to said desired information;

(iii) creating search data from said extracted terms in an form appropriate to each of said at least one search engines and transferring said created search data thereto to initiating a search;

(iv) receiving results comprising at least a list of information sources from each of said at least one search engines and removing redundancies therefrom to obtain a reduced list of information sources;

(v) retrieving complete copies of each information source in said reduced list;

(vi) examining each said retrieved complete copy relative to said extracted terms to determine a match ranking therefor and to identify relevant portions of said information source; and (vii) providing said identified relevant portions to said user in order of said determined rankings.

Preferably, at least two search engines are employed. Also preferably, the extraction of relevant terms by the natural language parser includes adding terms which are alternatives and/or synonyms to terms directly extracted from the natural language query. Also preferably, the relevant portions provided to the user are at least complete paragraphs of information.

According to another aspect of the present invention, there is provided a meta-search system comprising:

a natural language query processor to produce a set of relevant terms from a natural language query;

a meta-search engine means to communicate with said at least one search engine, to form from said relevant terms a search data set for each said at least one search engine which is in a format defined for said at least one search engine and to receive search results from said at least one search engine;

filter means to remove redundancies from said received search results to produce a reduced list of identified information sources;

information retrieval means to retrieve said identified information sources;

selection means to examine each information source retrieved by said information retrieval means and to rank each said information source relative to said set of relevant terms and to identify portions of said each said information source relevant to said extracted terms; and output means to provide said user with said identified portions in order of said ranking.

Preferably, at least two search engines are employed. Also preferably, the extraction of relevant terms by the natural language query processor includes adding terms which are alternatives and/or synonyms to terms directly extracted from the natural language query. Also preferably, the identified portions output to the user are at least complete paragraphs of information.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
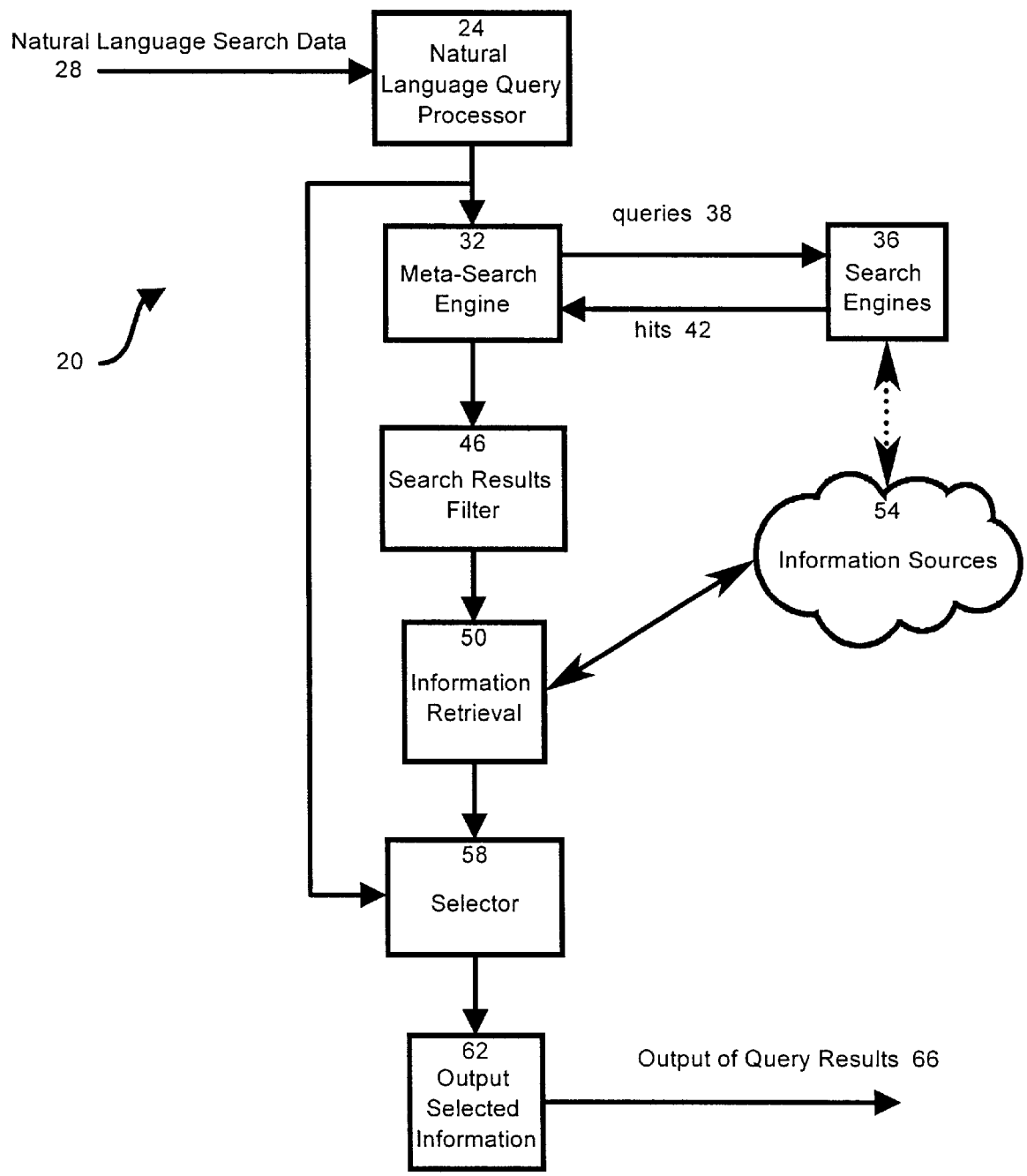
FIG. 1 shows a schematic representation of a meta-search system in accordance with the present invention.

FIG. 1 shows a meta-search system 20 in accordance with an embodiment of the present invention. As used herein, the term "meta-search" system and/or method is intended to comprise a search system and/or method which acts between a user and one or more search engines. As described below, the meta-search system can accept a natural language query, extract relevant terms and/or phrases from that query to produce search queries appropriate to each of one or more search engines. The meta-search system has one or more of these search engines process a search query or queries to provide the meta-search system with a list of 'hits'. The meta-search engine accumulates these hits and examines them to remove redundancies. A copy of the complete information source is retrieved for a pre-selected number of the non-redundant hits and these copies are examined by the meta-search engine to determine a ranking for each information source and to determine the portions of the information source which relate to the extracted relevant terms. These portions are output to the user, in ranked order, as the results of the search.

As shown in FIG. 1, system 20 includes a Natural Language Query Processor 24 which is operable to receive Natural Language Search Data 28 and to extract relevant terms and/or phrases therefrom. Specifically, search data 28 can comprise one or more complete or incomplete sentences which processor 24 parses.

Figure 2:
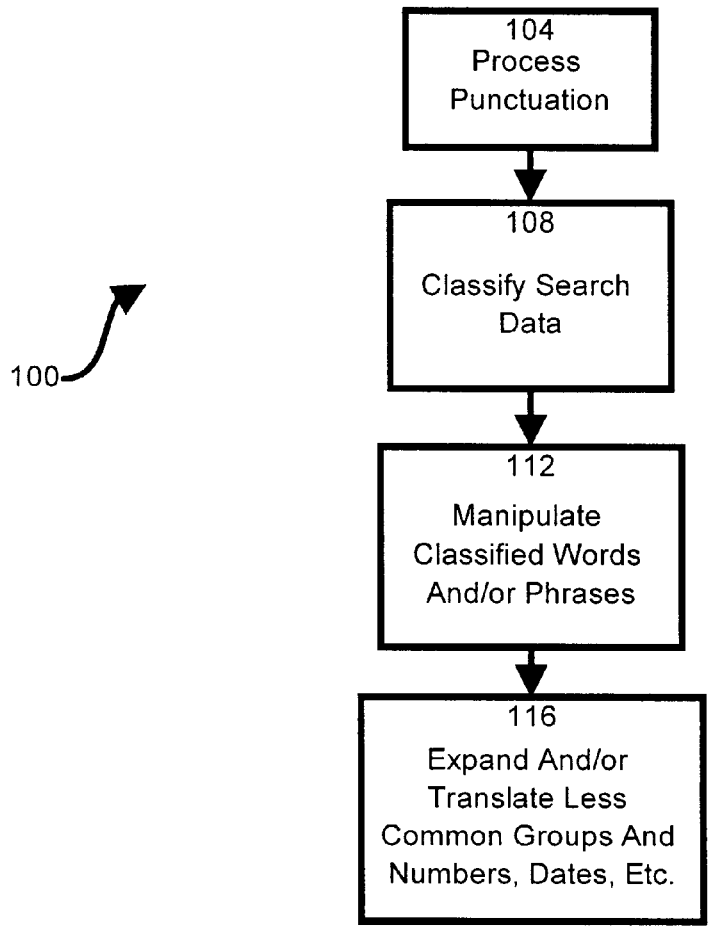
FIG. 2 shows a schematic representation of a natural language query processor in accordance with an embodiment of the present invention.
Figure 4C:
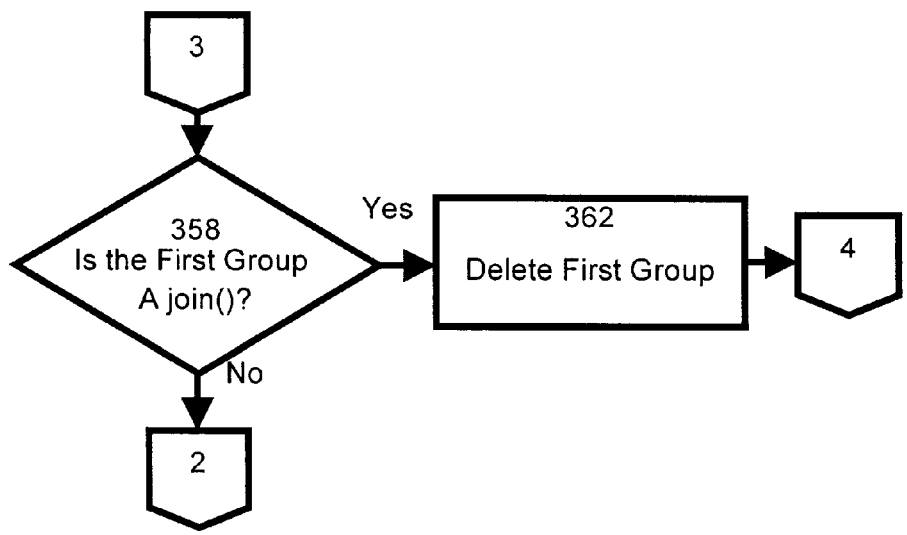
FIGS. 4a through 4e show schematic representations of a manipulation step of the natural language query processor of FIG. 2.

Referring to FIG. 2, the parsing process 100 employed by processor 24 is shown. At step 104, search data 28 is accepted and processed to remove punctuation. At step 108, groups (words and/or phrases) are classified according to a preselected classification scheme. Next, the classified groups are manipulated at step 112 to obtain a list of extracted relevant terms and this list is expanded, at step 116, to convert groups of less common phrases into more common phrases.

Specifically, at step 104 search data 28 is examined to remove all trailing punctuation, such as "?", "!" and ".", including any of these appearing before a closing single or double quotation mark. Next, all commas, colons, semi-colons are removed and any "abandoned" punctuation, defined by spaces, returns or linefeeds on either or both sides, is removed. An example of abandoned punctuation is the hyphen in "take a break—today". Processing then proceeds to step 108 which is described below, with reference to FIG. 3.

Figure 3:
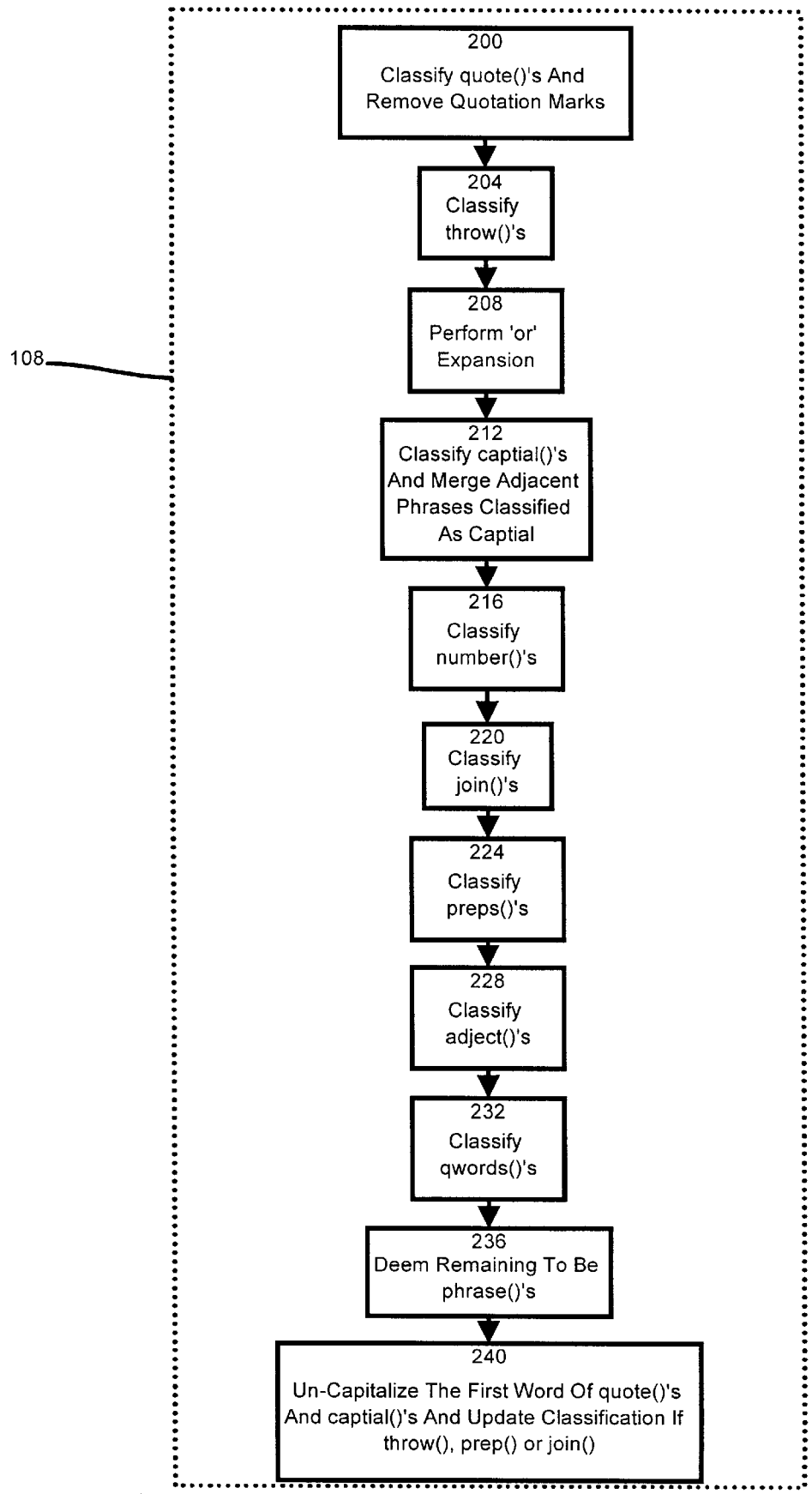
FIG. 3 shows a schematic representation of a classification step of the natural language query processor of FIG. 2.

FIG. 3 illustrates sub-steps of step 108 wherein, at step 200, each group between quotation marks is classified as a quote() and the corresponding quotation marks are then removed from search data 28, i.e.—"grand canyon" is classified as quote(grand canyon).

At step 204, a comparison is performed between the processed search data 28 and a list of null content phrases, referred to by the present inventor as "throw away phrases". Each match between a group in processed search data 28 (other than groups classified as quote()) and the list of null content phrases is classified as a throw(). Example lists of null content phrases and null content words, in accordance with an embodiment of the present invention, are included herewith as Tables 1 and 2 respectively in Appendix A.

Next, at step 208, an "or" expansion is performed if required. An "or" expansion is intended to convert phrases such as "big/huge/jumbo" into distinct terms separated by or's, i.e.—"big or huge or jumbo".

Next, each word in processed search data 28 which has not been classified as being part of a quote() or a throw() is examined and categorized. An example of a set of categories used in a present embodiment of the invention includes: quote(), throw(), capital(), number(), join(), prep(), adject(), qword(), or(), rank1() and phrase(), of which quote() and throw() are discussed above and the remainder of which are described below. Classification proceeds in the order given above, with classification of groups as capital()'s being considered before number()'s, etc.

At step 212 each remaining unclassified word is examined to determine if it is within the definition of the capital() category. Specifically, if the first character of the word is capitalized, the word is classified as a capital(). Adjacent words which have been classified as capital()'s are combined into groups which are then classified as capital(), i.e.—capital(Mickey) capital(Mouse) are combined to capital (Mickey Mouse).

At step 216, each remaining unclassified word is examined to determine if it is within the definition of the number() category. Specifically, if the first character of the word is a number, the word is classified as a number().

At step 220, each remaining unclassified word is examined to determine if it is within the definition of the join() category. Specifically, the word is compared to a predefined list of words and, if the word is present in the list, the word is classified as a join(). An example of a list of words which are used for classifying join()'s in accordance with an embodiment of the present invention is included herewith as Table 3 in Appendix A.

At step 224, each remaining unclassified word is examined to determine if it is within the definition of the prep() category. Specifically, the word is compared to a predefined list of words and, if the word is present in the list, the word is classified as a prep(). An example of a list of words which are used for classifying prep()'s in accordance with an embodiment of the present invention is included herewith as Table 4 in Appendix A.

At step 228, each remaining unclassified word is examined to determine if it is within the definition of the adject() category. Specifically, the word is compared to a predefined list of words and, if the word is present in the list, the word is classified as a adject(). An example of a list of words which are used for classifying adject()'s in accordance with an embodiment of the present invention is included herewith as Table 5 in Appendix A.

At step 232, each remaining unclassified word is examined to determine if it is within the definition of the qword() category. Specifically, the word is compared to a predefined list of words and, if the word is present in the list, the word is classified as a qword(). An example of a list of words which are used for classifying qword()'s in accordance with an embodiment of the present invention is included herewith as Table 6 in Appendix A.

At step 236, each remaining unclassified word is then deemed to be a phrase(). Adjacent words in processed search data 28 which are categorized as phrase()'s are combined to form phrases which are then categorized as phrase().

Finally, at step 240, the first word of each classified quote() is examined to determine if it is capitalized. If it is, it is converted to lowercase and it is compared to the respective lists to determine if it can be classified as a throw(), prep() or join(). If it can be, it is removed from the quote() and re-classified accordingly. A similar process if performed for the first word of each classified capital().

The next step of parsing process 100 is step 112, in FIG. 2, wherein the classified words and/or phrases are manipulated to extract the most relevant terms therefrom. Step 112 is described with reference to FIGS. 4a through 4e, which illustrate sub-steps of step 112. Specifically, at step 250, a check is first performed to ensure that search data 28 contains groups (either a word or phrase) which has been classified as other than throw(). If all groups in search data 28 are classified as throw(), an error message is presented to the user instructing them to rewrite their search data at step 254. Otherwise, all groups in search data 28 which have been classified as throw()'s are discarded at step 258.

Next, a determination is made at step 262 as to whether the first remaining group in search data 28 is classified as phrase(). If the first remaining group is classified phrase(), then a determination is made at step 266 as to whether any group exists in search data 28 which has been classified as capital() or quote() and which is not immediately preceded with a group classified as prep() or join(). If one or more such groups are present in search data 28, the first such group's classification is changed at step 270 to rank1(). If, at step 266, it is determined that no such group exists in search data 28, the classification of the first group is changed from phrase() to rank1() at step 274.

If, at step 262, the first remaining group is not classified phrase() then a determination is made at step 278 as to whether the first remaining group in search data 28 is classified number(), adject(), or qword(). If the first remaining group is one of these classifications, a determination is made at step 282 as to whether any group exists in search data 28 which has been classified as capital() or quote() and which is not immediately preceded with a group classified as prep() or join(). If one or more such groups are present in search data 28, the first such group's classification is changed, at step 286, to rank1().

If, at step 282, no such group classified as capital() or quote() exists, a determination is made at step 290 as to whether there is any remaining group in search data 28 which is classified phrase(). If there is at least one such group, the classification of the first of these groups is changed to rank1() at step 294.

If, at step 290, there is no such group then a determination is made, at step 298, as to whether there is a remaining group in search data 28 which is classified number() or adject(). If there is at least one such group, the classification of the first of these groups is changed to rank1() at step 302.

If, at step 298, there is no such group, the first remaining group in search data 28, which was classified qword(), is changed at step 306 to a rank1() classification.

If, at step 278, it was determined that the first remaining group in search data 28 was not classified number(), adject() or qword(), then a determination is made at step 310 (in FIG. 4b) as to whether the first remaining group is classified as capital() or quote(). If the first remaining group is classified as capital() or quote(), it is changed to a classification of rank1() at step 314.

If, at step 310, the first remaining group is not classified as capital() or quote(), then a determination is made at step 318 as to whether the first remaining group is classified as prep(). If it is, then at step 322 a determination is made as to whether any group exists in search data 28 which has been classified as capital() or quote() and which is not immediately preceded with a group classified as prep() or join(). If one or more such groups are present in search data 28, the first such group's classification is changed at step 326 to rank1().

If, at step 322, it is determined that no group classified as capital() or quote() exists in search data 28 that is not immediately preceded by a group classified prep() or join(), then at step 330 a determination is made as to whether any group exists in search data 28 which has been classified as phrase() which is not immediately preceded with a group classified as prep() or join(). If one or more such groups are present in search data 28, the first such group's classification is changed at step 334 to rank1().

If, at step 330, it is determined that no group classified as phrase() exists in search data 28 that is not immediately preceded by a group classified prep() or join(), then at step 338 a determination is made as to whether any group exists in search data 28 which has been classified as number() or adject() and which is not immediately preceded with a group classified as prep() or join(). If one or more such groups are present in search data 28, the first such group's classification is changed at step 342 to rank1().

If, at step 338, it is determined that no group classified as number() or adject() exists in search data 28 that is not immediately preceded by a group classified prep() or join(), then at step 346 a determination is made as to whether any group exists in search data 28 other than groups classified prep() or join(). If no such other groups remain in search data 28, then an error message is presented to the user at step 350. If such other groups do exist, then the first group of quote(), capital(), number(), adject(), or qword classification is changed to rank1() at step 354.

If, at step 318, the first group is not classified as prep(), then at step 358 (FIG. 4c) a determination is made as to whether the first remaining group is classified as a join(). If it is, this group is deleted from search data 28 at step 362 and processing reverts to step 262.

At step 366 (FIG. 4d), the first remaining group in search data 28 is selected for examination. At step 370, a determination is made as to whether the group is a phrase(), number(), capital() or quote() classification and whether it is immediately preceded by a group which is a join(). If these conditions are met by the group being examined and if the join() which precedes the group is in turn preceded by a group classified as rank1(), then at step 374 the classification of the group is changed to also be rank1(), i.e.—rank1(IBM) join(and) phrase(compiler) becomes rank1(IBM) join(and) rank1(compiler).

If the conditions of step 370 are not met by the group, at step 378 a determination is made as to whether the group is an adject() which is immediately preceded by a join() and, if so, if the group which immediately precedes that join() is classified as rank1(). If these conditions are met, then the first following group which was classified phrase(), number (), capital() or quote() is changed to rank1() at step 382.

If the conditions of step 378 are not met, at step 386 a determination is made as to whether the group is classified as a phrase(), number(), capital() or quote() and if it is immediately followed by a group classified as join() which is in turn immediately followed by a group which is classified as rank1(). If these conditions are met, then the classification of the group is changed to rank1() at step 390.

Figure 4A:
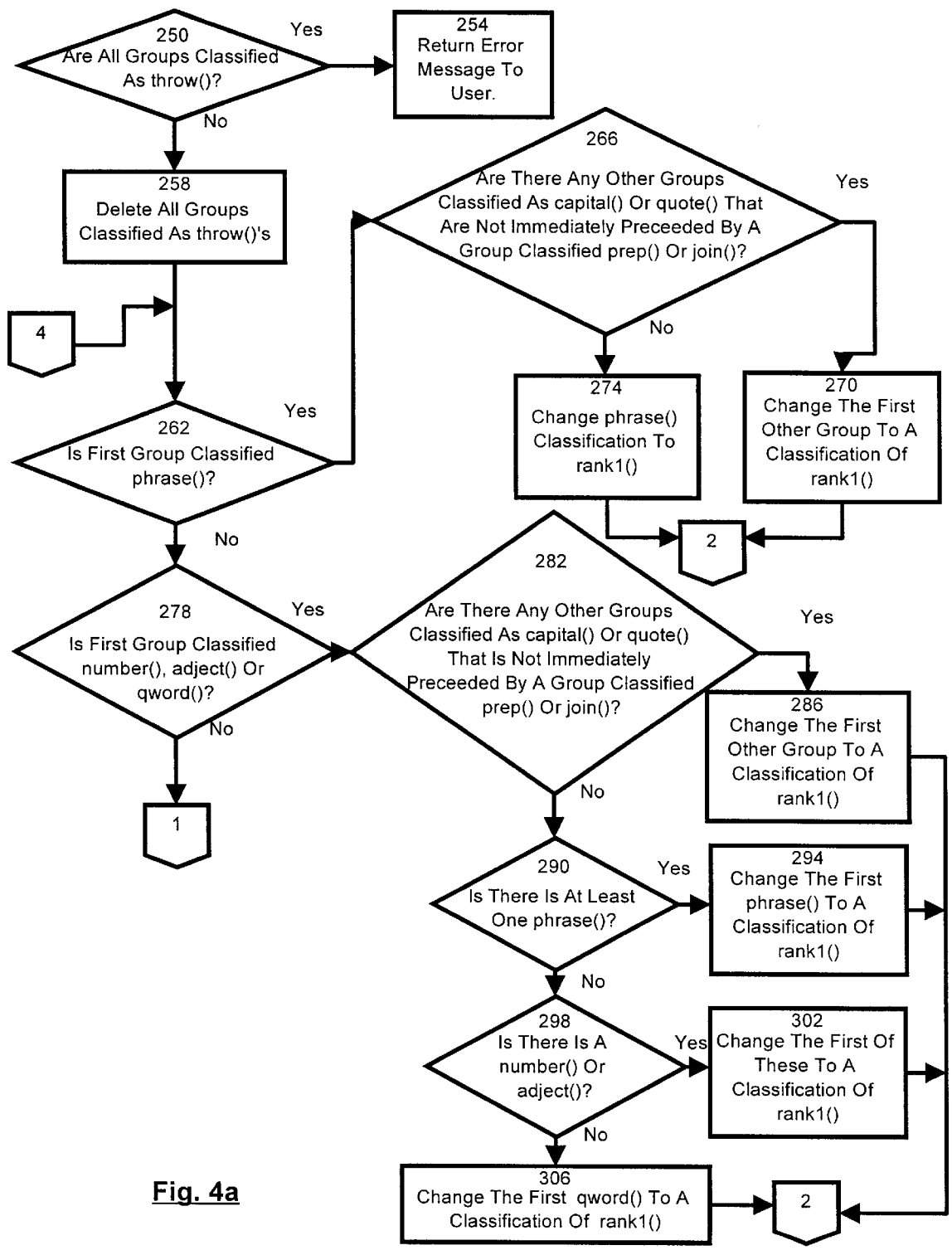
Figure 4B:
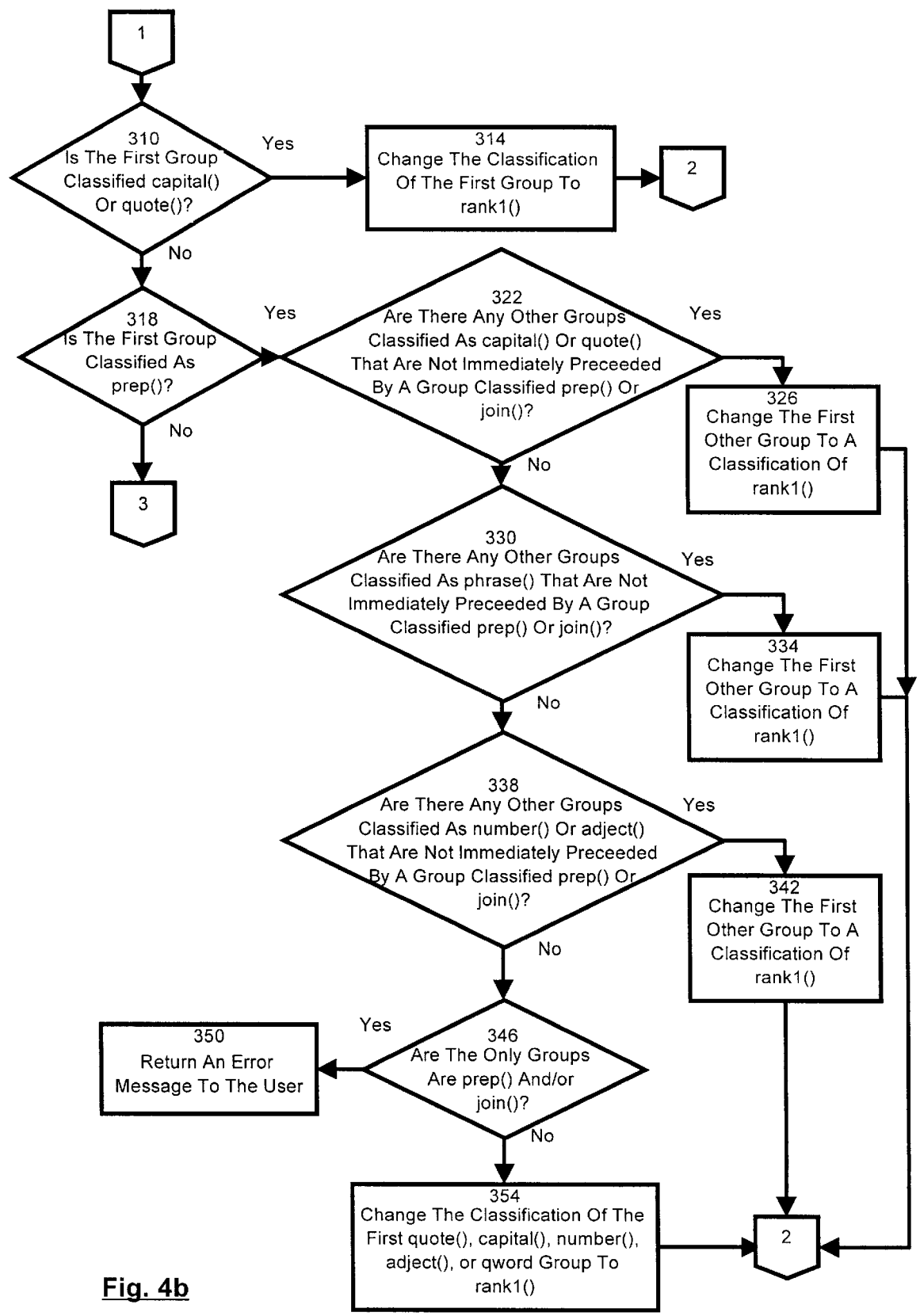
Figure 4D:
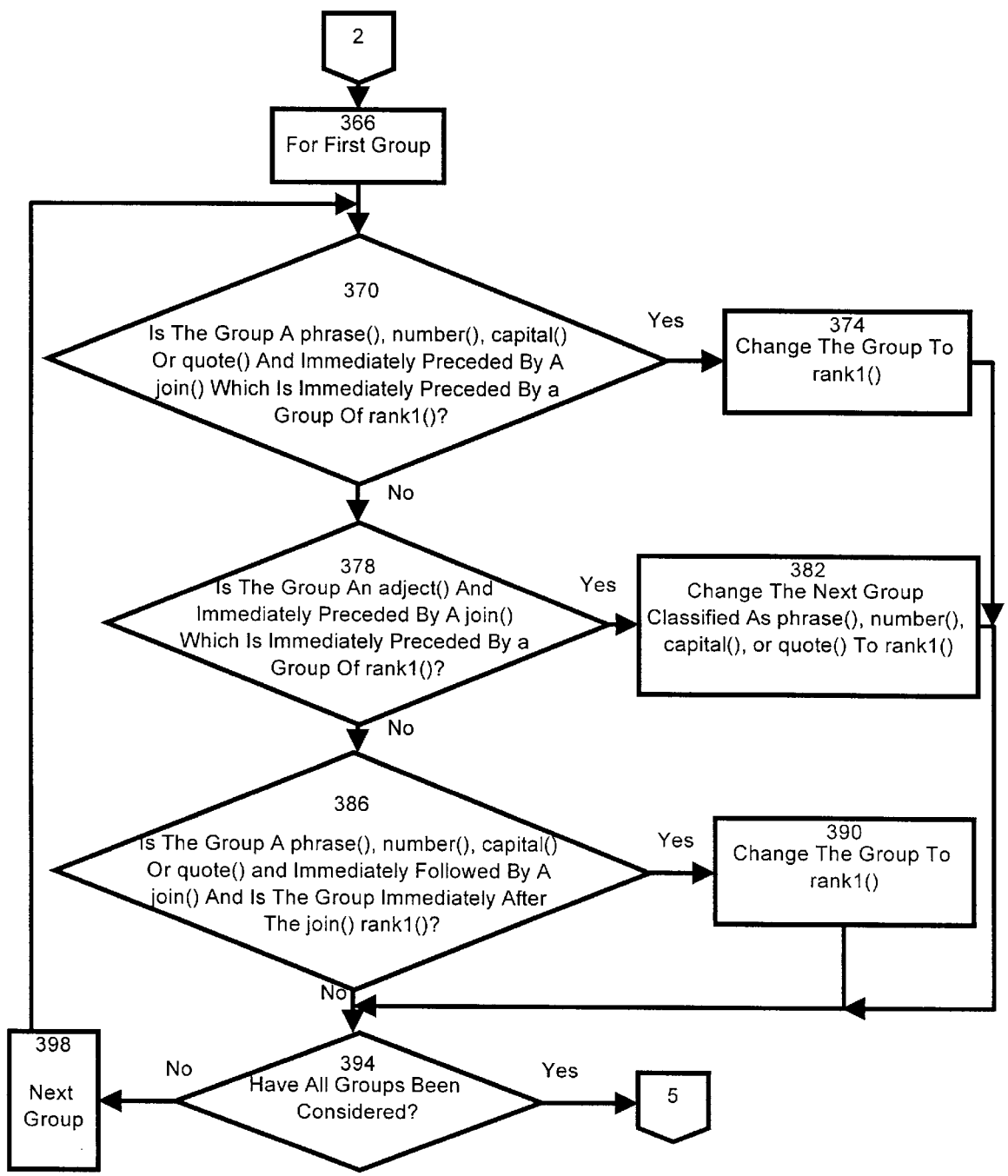
Figure 4E:
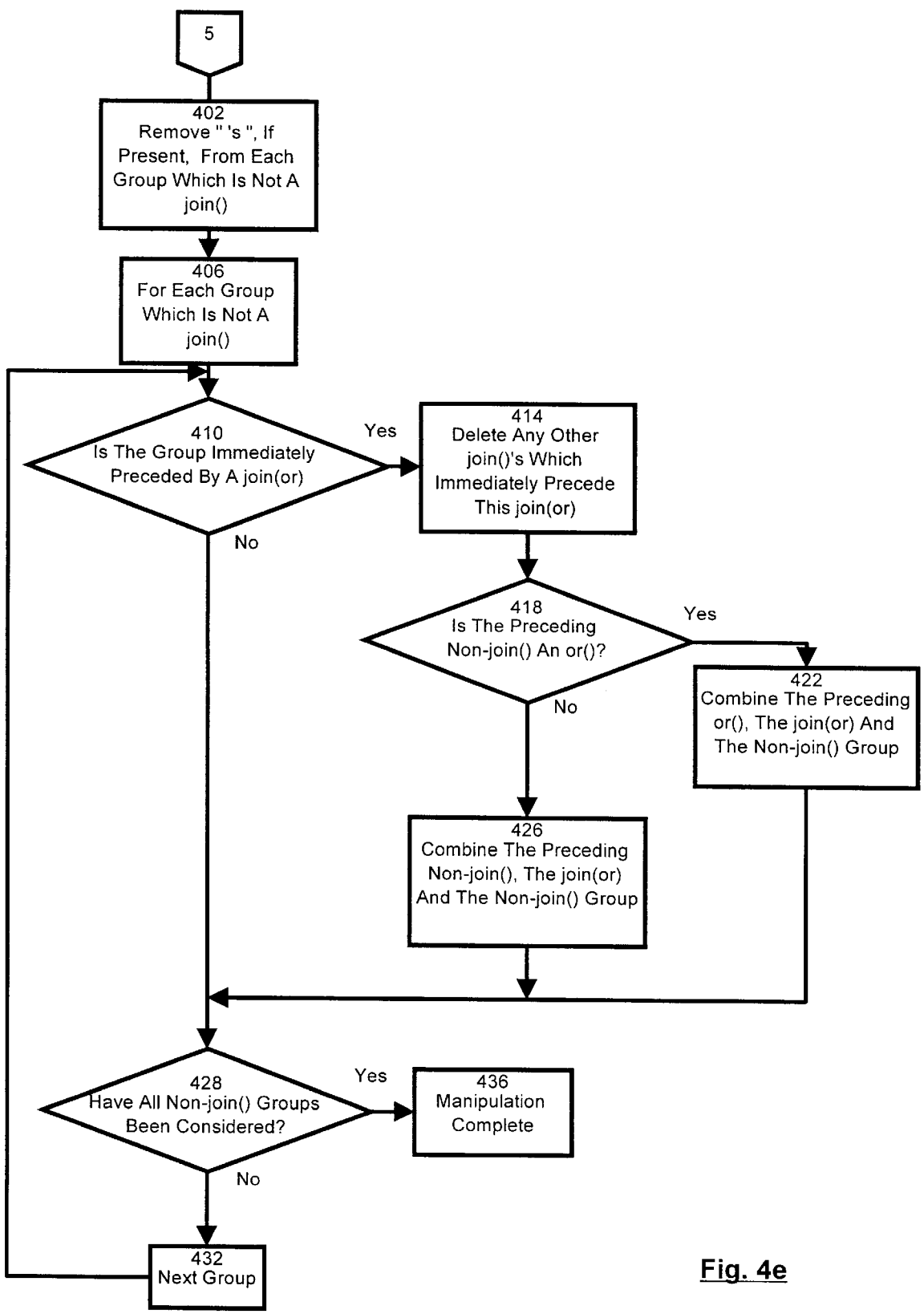

At step 394, a determination is made as to whether all of the groups in search data 28 have been considered. If not, the next group is selected for consideration at step 398 and processing returns to step 370. Once, at step 394, it is determined that all remaining groups have been considered, processing continues at step 402 (FIG. 4e).

At step 402, apostrophe s's ('s) are deleted, if present, from each non-join() group. Next, at step 406, the first remaining group which is not classified as a join() is examined. A determination is made at step 410 as to whether the group which immediately precedes this group is a join(or). The term "join(or)" refers to the word 'or', from Table 3 of Appendix A, which will have been classified as a join(). If the condition at step 410 is true, then at step 414 any other join()'s which immediately precede the join(or) are removed.

Next, at step 418, a determination is made as to whether the immediately preceding non-join() is an or(). An or() is a classification for a list of search data words which can be separated by boolean OR's. For example, search data, "A or B or C" is re-expressed as or(A, B, C) for efficiency and convenience reasons. If, at step 418 the immediately preceding non-join() is an or(), then the preceding or(), the join(or) and the non-join() groups are combined.

If, at step 418, the preceding Non-join() is not an or(), processing continues at step 426 wherein the preceding non-join(), the join(or) and the non-join() group are combined.

As an example of steps 418, 422 and 426, given search data which has been classified as "phrase(pass) prep(from) capital(Tinkers) join(or) capital(Evert) join(or) capital (Chance)", when group "capital(Evert)" is processed at step 418, the processing will proceed to step 426. At step 426, the search data is combined to read, "phrase(pass) prep(from) or(capital(Tinkers), capital(Evert)) join(or) capital(Chance)". Next, when processing group "capital (Chance)" at step 418, the processing will proceed to step 422 wherein the search data is combined to read, "phrase (pass) prep(from) or(capital(Tinkers), capital(Evert), capital (Chance))".

At step 428 a determination is made as to whether all non-join() groups have been considered and, if not, the next group is selected at step 432 and processing reverts to step 406. If, at step 428, it is determined that all non-join() groups have been considered, the manipulation process is complete, as indicated at 436.

Once the manipulation of the classified words at step 112 is complete, step 116 of parsing process 100 is performed to complete the process. Specifically, in step 116 an examination is performed on each remaining group in search data 28 to determine groups which can advantageously be translated and/or enhanced. A translation table (not shown) of words and phrases and their preferred alternatives is maintained by process 100 and the remaining groups in search data 28 are compared to the entries in this table. For each match, the matching group is replaced with the preferred alternative, either explicitly or via a translation function.

For example, the translation table can contain an explicit entry for "get in touch" for which a preferred alternative can be "contact". Any group in search data 28 which contains the phrase "get in touch" will have this phrase replaced by "contact". As another example, the translation table can contain a function to convert time-related words into numeric equivalents. Specifically, any group in search data 28 containing the word "today" will have this word replaced with the current date in an appropriate format, such as dd/mm/yy. Similarly, whole numbers can be converted to text form, i.e. "7" converted to "seven".

Finally, step 116 can perform a synonym expansion for selected words and/or phrases. For example, the word "discover" can be expanded to "discover or invent or find".

Referring again to FIG. 1, Natural Language Query Processor 24 passes the processed search data 28 to meta search engine 32. Meta search engine 32 receives processed search data 28 and further processes it to place it into forms suitable for the search engine or engines 36 which are defined for the information sources to be searched. For example, if the information sources to be searched are WWW pages, search engines 36 can be appropriate search engines such as Lycos, AltaVista, etc. Or, if a commercial database is to be searched, such as Lexis, search engines 36 can be the database's proprietary search engine. In any case, meta search engine 32 is responsible for assembling queries which are appropriate to each search engine 26 from processed search data 28.

In a present embodiment of meta search engine 32, queries are assembled for three search engines 36, specifically the AltaVista, Lycos and Excite search engines for WWW pages. As will be apparent, fewer or more search engines can be employed if desired. It is also contemplated that different sets of search engines can be employed for different subject matters. For example, general enquiries may be passed to the set of three search engines mentioned above, while an enquiry relating to legal issues may be sent to any two of these search engines and to the Lexis database. It is contemplated that the selection of an appropriate set of search engines can either be performed explicitly by the user, or implicitly by the search system 20, based upon recognized keywords in the processed search data 28 or other information such as the user's identity, location, etc.

Figure 5:
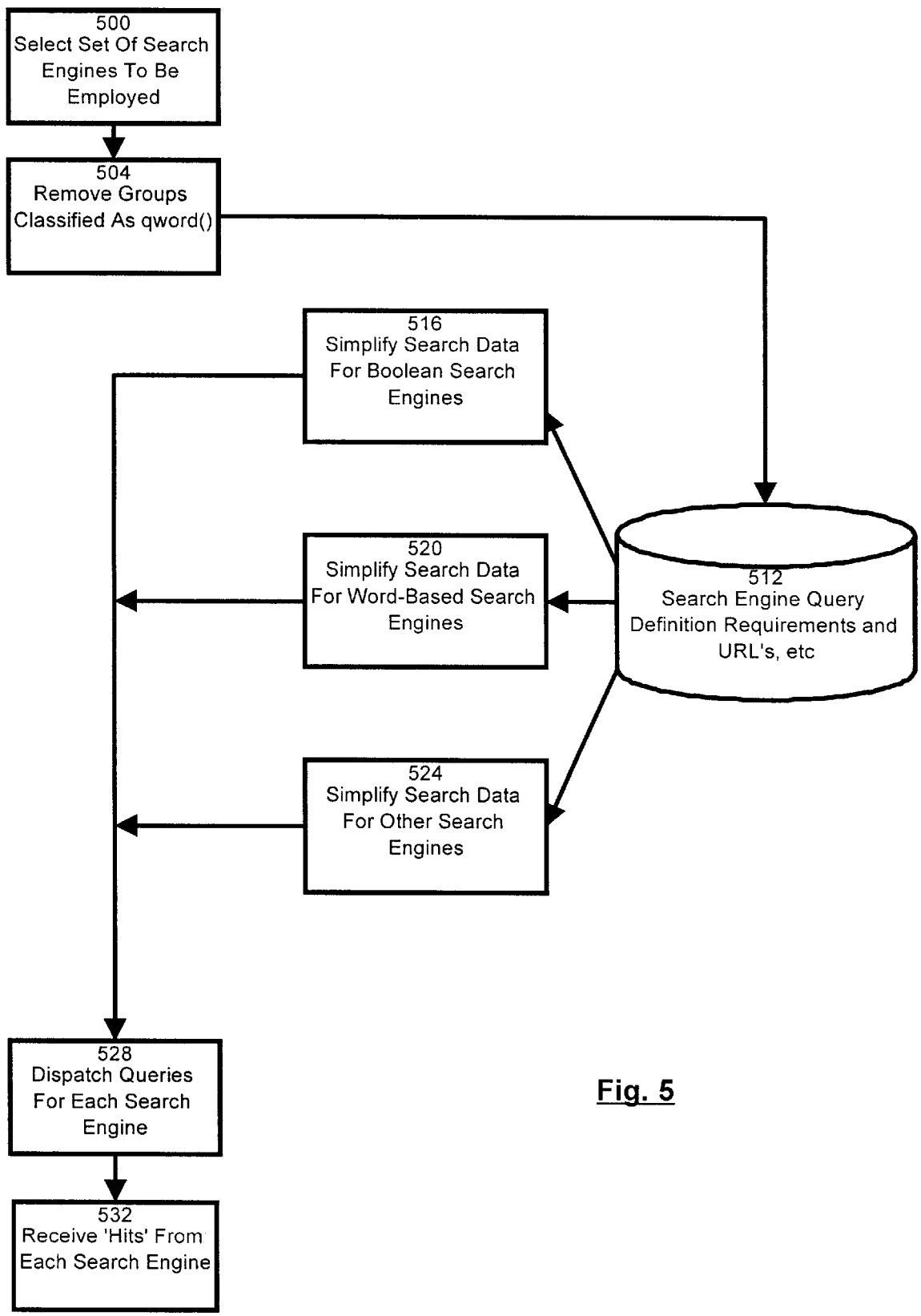
FIGS. 5, 5a and 5b show schematic representations of a meta search engine in accordance with an embodiment of the present invention.
Figure 5A:
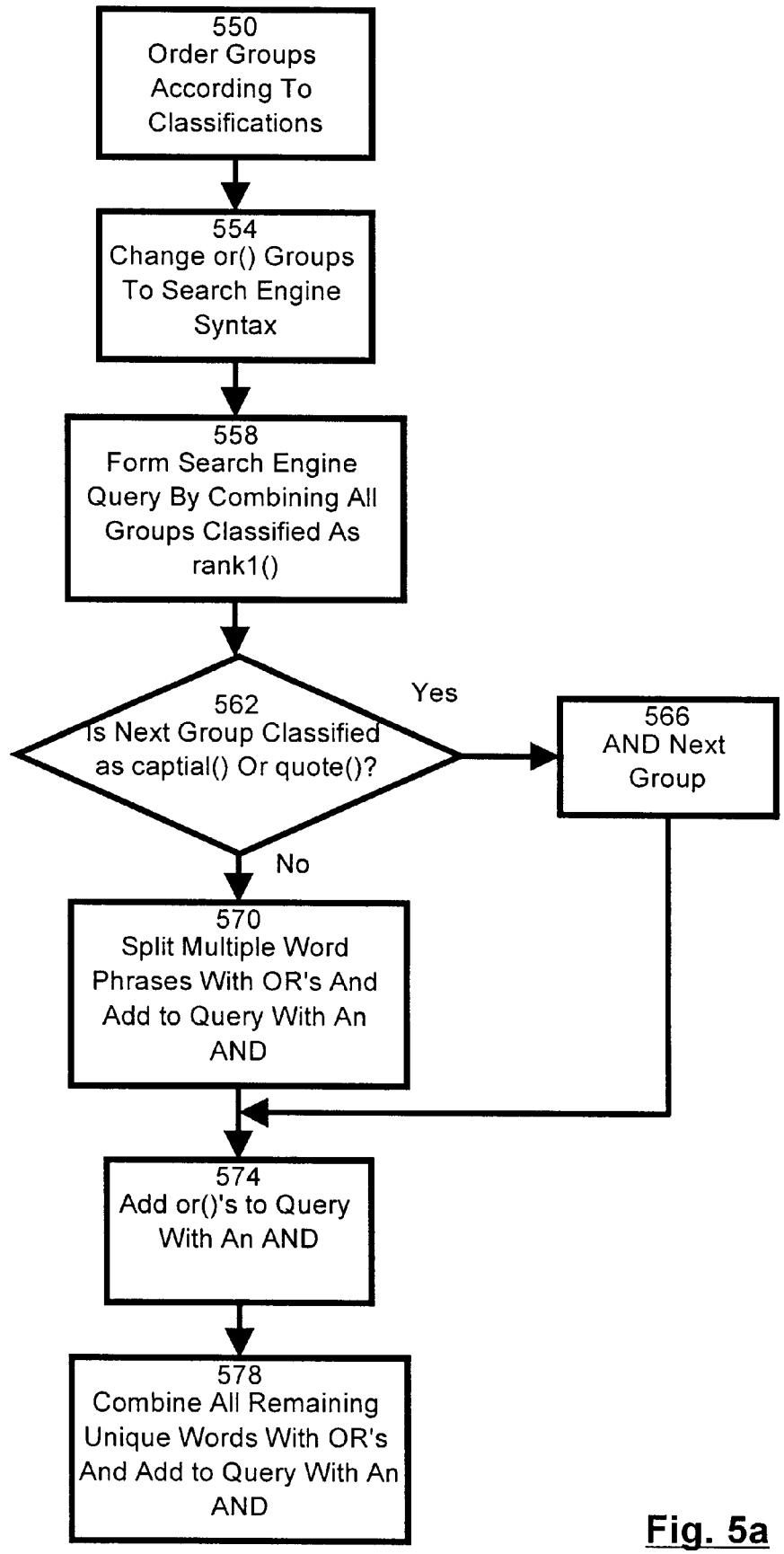
Figure 5B:
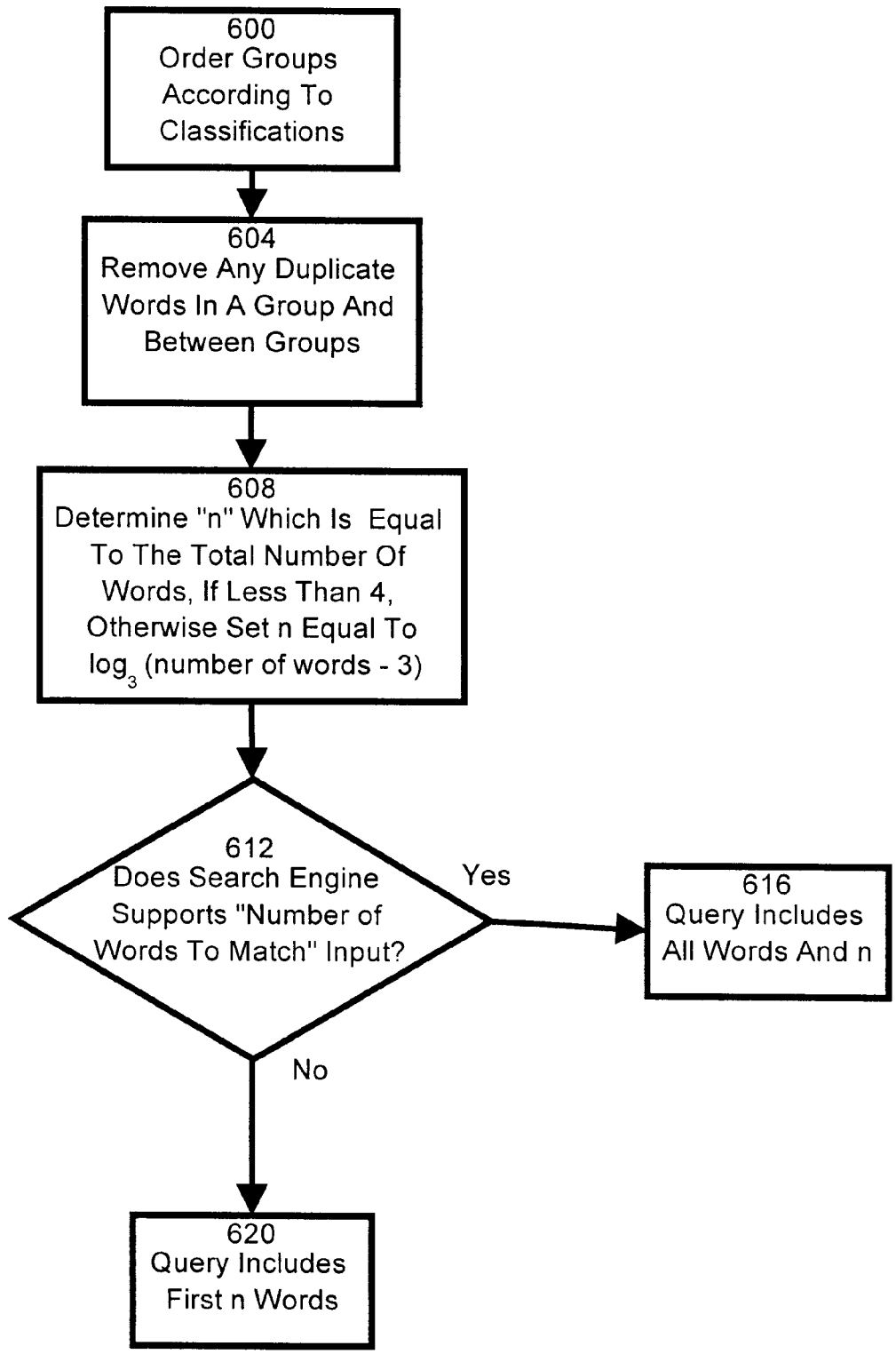

As shown in FIGS. 5, 5a and 5b, at step 500 a set of search engines is selected. As mentioned above, this can be either an implicit selection (a default set) or an explicit selection made by the user or by the search system 20. Next, at step 504, search data 28 is examined and all groups classified as qword() are removed from the processed search data 28. Next, at step 512, a database of search engine capabilities, requirements and addresses (URL's or other appropriate address information) is consulted to determine the appropriate parameters for each search engine in the selected set of search engines.

If one or more boolean-type search engines such as Excite, AltaVista, etc. are included in the set of search engines, at step 516, search data 28 is simplified for such engines.

FIG. 5a shows a simplification for such boolean engines wherein at step 550, the groups in search data 28 are sorted by classification, with the presently preferred sort order being rank1(), or(), capital(), quote(), phrase(), adject() and number(). At step 554, each or() group is changed to the syntax required by the search engine, for example or(phrase (a), capital(b), phrase(c)) can be converted to (a or b or c). At step 558, the first portion of the query for the boolean search engine is formed by combining all of the groups which were classified as rank1(), separated by AND'S.

At step 562, a determination is made as to whether the next remaining group is classified as capital() or quote() and, if it is, that group is added to the query with an AND at step 566. If, at step 562, the next group is not a capital() or quote(), at step 570 multiple word phrases are split into individual words and combined with OR's and the resulting structure is add to the query with an AND. Next, at step 574, all or()'s are added to the query with an AND and, at step 578, all remaining unique words in the search data are combined into a structure, wherein each word is separated by an OR, and the resulting structure is added to the query with an AND.

If one or more "word-only" type search engines such as Lycos, HotBot, etc. are included in the set of search engines, at step 520, search data 28 is simplified for such engines. Specifically, as shown in FIG. 5b, at step 600 the groups in search data 28 are sorted by classification, with the presently preferred sort order being rank1(), or(), capital(), quote(), phrase(), adject() and number(). Next, at step 604, the contents of all of the groups are examined to remove duplicate words in a group, or between groups.

At step 608, a number n is determined as being the number of words remaining in search data 28, if less than four, or the value $\log_3$ (number of words—3). Next, at step 612, a determination is made as to whether the selected search engine accepts an input representing the "number of words to be matched" to have a 'hit'. If the engine does support this input, as determined from the information in database 512, then at step 616 the query is composed and consists of all of the words and n. If, at step 612, the engine does not support a "number of words to be matched" input then at step 620 the query is composed and comprises the first n words.

If one or more other search engines, such as Lexis, etc. are included in the set of search engines, at step 524, search data 28 is appropriately simplified for such engines as will be apparent, to those of skill in the art, in view of the above.

Referring again to FIG. 1, the simplified queries 38 from meta-search engine 32 are dispatched to the corresponding search engines 36 via suitable transmission means. For example, if a search engine is accessible from a web page on the internet, the query is sent to the URL for that web page with the query being in the required format. As will be apparent to those of skill in the art, the present invention is not limited to internet and/or World Wide Web-based search engines and any accessible search engine can be employed. Examples of such search engines include, but are not limited to, those accessible via a LAN, a dedicated telecommunications line, a dial-up telecommunications link, etc., or even one or more search engines integral with system 20 can all be employed with the present system.

At step 532 in FIG. 5, 'hits' 42 (in FIG. 1) from each search engine are received by meta-search engine 32. These hits are then passed to Search Results Filter 46 when results have been obtained from all of the search engines in the set or when a predetermined time limit has been exceeded without receiving results from one or more search engine.

The hits received by Search Results Filter 46 are generally in the form of an address, such as a URL, at which a relevant information source can be located and the identity of the search engine which returned the hit. Search Results Filter 46 combines the hits from each search engine into a single list and removes redundancies. The culled list of hits is placed into the format necessary to retrieve the individual information sources and this formatted list is transferred to Information Retrieval means 50.

From this formatted list, Information Retrieval means 50 retrieves the complete information sources 54 for each of a preselected maximum number of hits from each search engine 36. For example, the first 10 hits from each engine, after redundancies have been removed, may be retrieved.

The retrieved information sources are then examined by the Selector means 58. Selector means 58 performs several functions, including ranking the relevancy of the information sources retrieved and identifying their relevant portions for output to the user.

Figure 6:
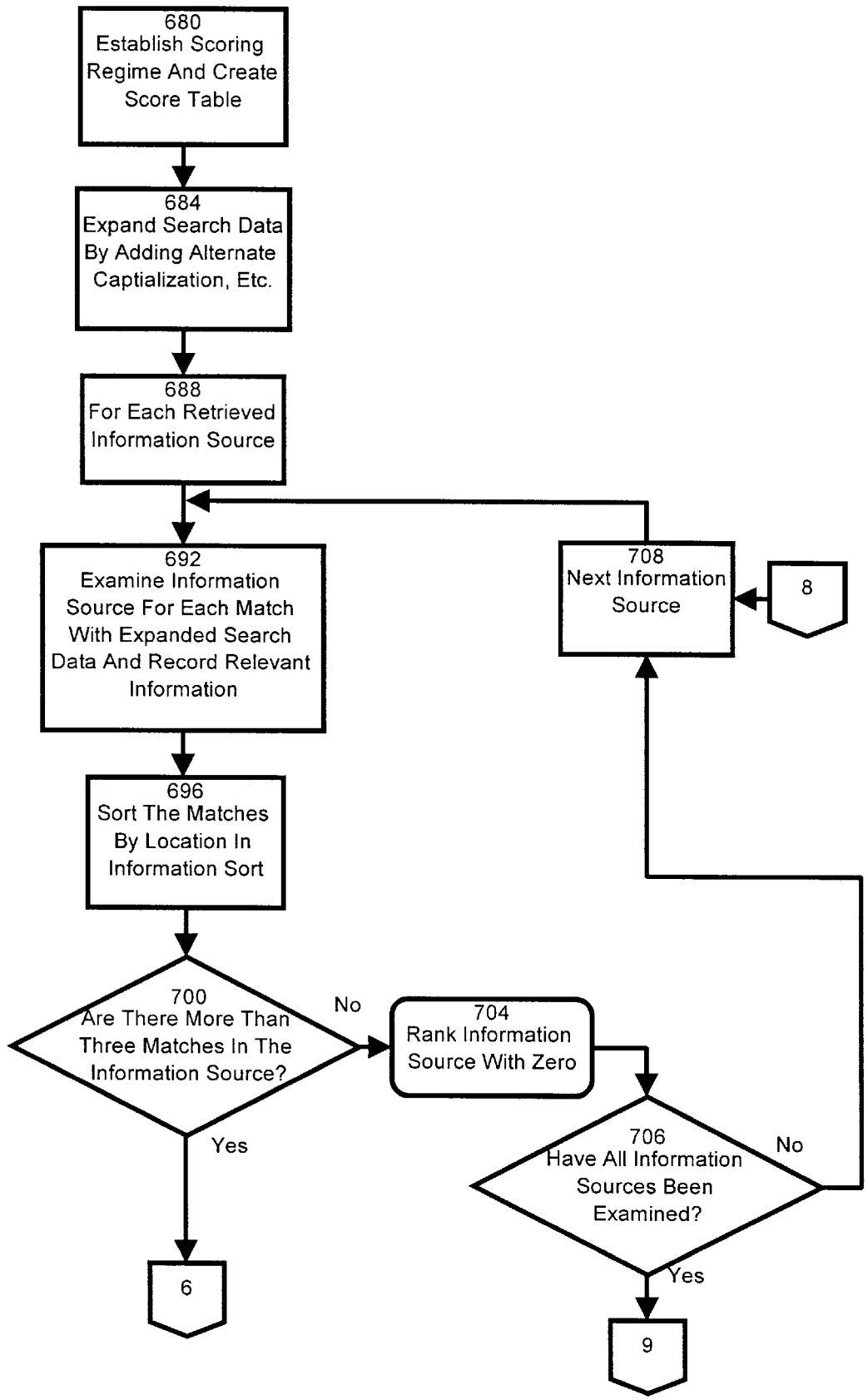
FIGS. 6, 6a, 6b and 6c show schematic representations of a selector in accordance with an embodiment of the present invention.

The process for ranking of the information sources employs the processed search data 28 from Natural Language Query Processor 24. Specifically, as illustrated at step 680 of FIG. 6, a scoring regime is established for the retrieved information sources relative to the processed search data 28 and a score table is created to hold determined scores for each information source. A presently preferred scoring regime is given in Appendix B. In this regime, each group in processed search data 28 is treated as a separate candidate and separate totals are maintained for each candidate in the score table. An example of processed search data 28 which reads, "or(phrase(contact), phrase(personnel), phrase(names)); phrase(people); rank1(Gravis); rank1 (Logitech))" has four candidates.

At step 684, the processed search data 28 is augmented by adding the following to processed search data 28: for each group with multiple word phrases, create another group wherein the first word is capitalized, (i.e.—for phrase(big sky) create group phrase(Big sky)); for each group with multiple word phrases, create another group wherein each word is capitalized, (i.e.—for phrase(big sky) create group phrase(Big Sky)); for each group with multiple words, including any capitalized groups created in the preceding steps, another group is created by replacing spaces in the group with +'s (i.e.—for phrase(Mickey Mouse), create phrase(Mickey+Mouse)); and for each word, whether in a single word group or a multi-word group, make new words by capitalizing them. For example, the phrase(mickey mouse pluto) becomes phrase(Mickey), phrase (Mouse) and phrase(Pluto). Each of these created groups is then added to the score table, with a score for any of these groups being considered a score for the candidate, i.e.—a match with the augmented phrase(Mickey mouse) is scored for the phrase (mickey mouse).

Next, at step 688, a first retrieved information source is selected. At step 692, the information source is examined to determine each match between its contents and the groups in the score table. For each match, an entry is made in the score table for the corresponding candidate including the score assigned the match under the selected scoring regime and the location of the match within the information source.

Next, at step 696, the matches are sorted by their location within the information source. At step 700, a determination is made as to whether more than three matches were found within the information source. If three or fewer matches were found, the information source is assigned a rank of zero at step 704 and, if at step 706 it is determined that one or more information sources remain to be considered, the next information source is selected at step 708 and processing returns to step 692.

Figure 6A:
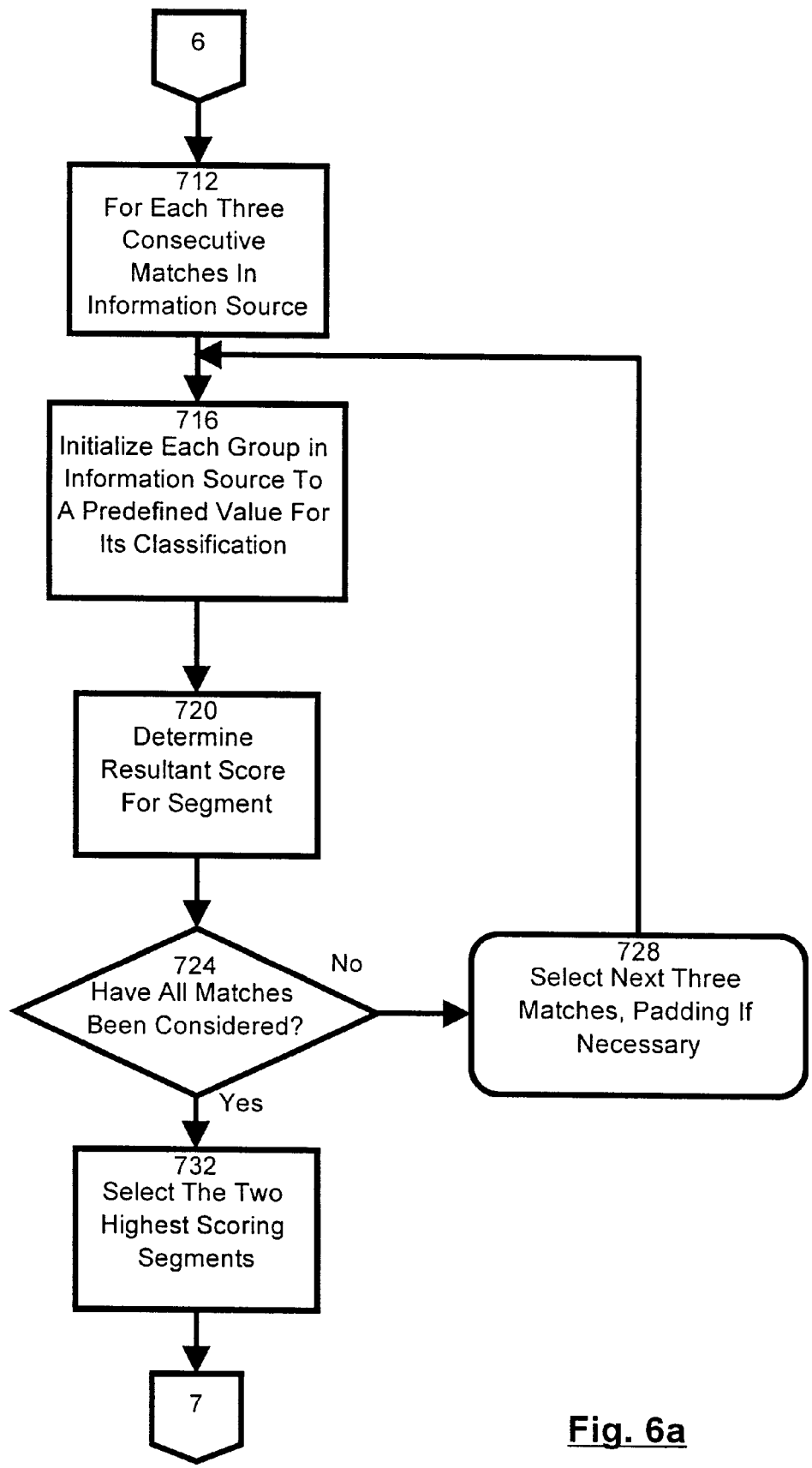

If at step 700 it is determined that more than three matches have been found in the information source, processing proceeds to step 712, shown in FIG. 6a, wherein the first three consecutive matches are selected for further consideration. At step 716, a table is established with an initial score value for each candidate. An example of a table of presently preferred initialization values is given in Appendix C.

At step 720, the scores are determined for the set of three hits, referred to herein as a segment. Specifically, these segment scores are determined by adding the scores of the corresponding candidates in each match with the initial score value for each respective candidate, from Appendix C, to obtain total scores for each candidate for the segment. These candidate totals are then multiplied together, including candidates which were not represented in the segment and which thus only have their initial value. This value is then divided by the length of the segment (i.e. the number of characters, including white space, etc. between the start of the first match being considered and end of the last match being considered).

The result of this calculation is then multiplied by the value $\log_{10}(x)^{1.5}$, where x is the previously determined length of the segment. This latter step weights the result against segments which are relatively small. Finally, the result of this calculation is divided by the value $1+\log_{10}(y)$, where y is the difference between the number of matches in the candidate with the greatest number of matches and the average number of matches for the other candidates, however if the value of y is determined to be less than one, it is set at one. This calculation is intended to weight the result against segments with a high number of matches in just a few candidates and few matches in the remaining candidates. The result of all of these calculations is the resultant segment score.

A step 724, a determination is made as to whether all matches in an information source have been considered. If unconsidered matches exist, the next three consecutive matches are selected for consideration as a segment at step 728. In the event that less than three unconsidered matches exist, a segment of three is formed at step 728 by "padding", namely by taking the last three consecutive matches, even if one or two of these matches have previously been considered. Processing then commences again at step 716.

If, at step 724, it is determined that all matches have been considered, the two segments with highest scores are selected at step 732. It will be apparent to those of skill in the art that, in the event that only a single segment exists in an information source, processing will proceed from step 724 to step 764, described below.

Figure 6B:
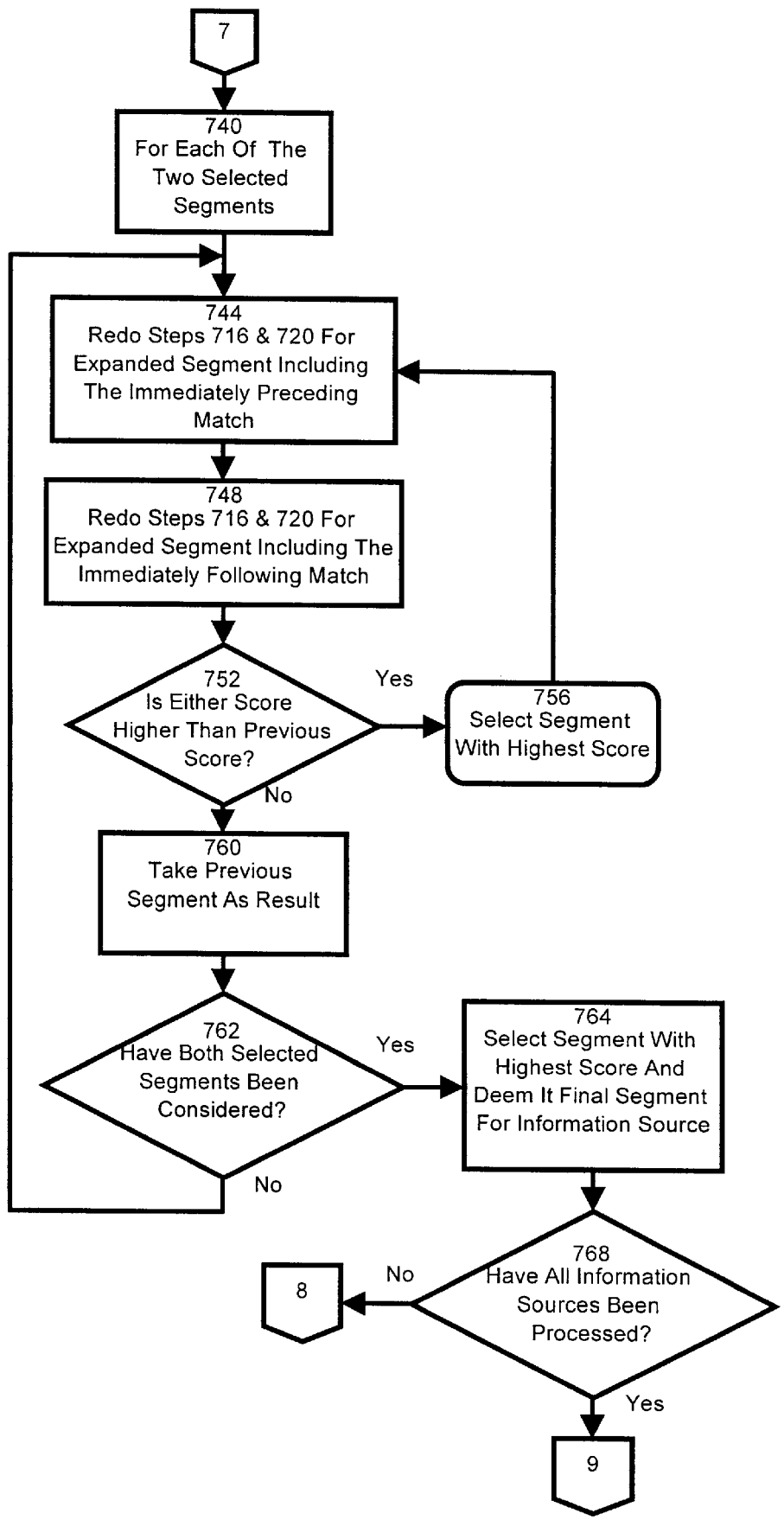

At step 740, as shown in FIG. 6b, the first of the two highest scoring segments is selected. At step 744, the selected segment is augmented by adding the immediately preceding match (if any) to form an augmented segment. As referred to herein, a segment is merely a first offset from the start of the information source defining the start location of the portion of the information under consideration and a second offset defining the end of the portion of interest in the information source. Thus, in step 744, the augmentation is accomplished by moving the first offset appropriately, towards the start of the information source. Similarly, when a segment is "scanned" or otherwise processed, the information source is actually being considered, between the two offsets.

Steps 716 and 720 are then performed again on this augmented segment. At step 748, the selected segment is augmented by adding the immediately following match (if any) to form a second augmented segment and steps 716 and 720 are then performed again.

At step 752, a determination is made as to whether the resulting score of either of these augmented segments is higher than the previous score for the segment. If at least one score is higher, the augmented segment with the highest score is selected at step 756 and steps 744 through 752 are performed again on the selected augmented segment, wherein the selected augmented segment is augmented to form two new augmented segments which are scored and compared to the score of the selected augmented segment.

This process of augmenting, scoring and comparing continues until it is determined, at step 752, that neither of the augmented segments have a score higher than the score of the previously selected segment. Once this is determined, the previous selected segment is deemed to be the result for the segment at step 760. A determination is made a step 762 as to whether the second highest scoring segment from step 732 has been considered and, if not, processing proceeds from step 744 for that segment. If both segments have been considered, then at step 764 the segment, whether augmented or not, with the highest score is deemed to be the segment of interest for the information source.

Figure 6C:
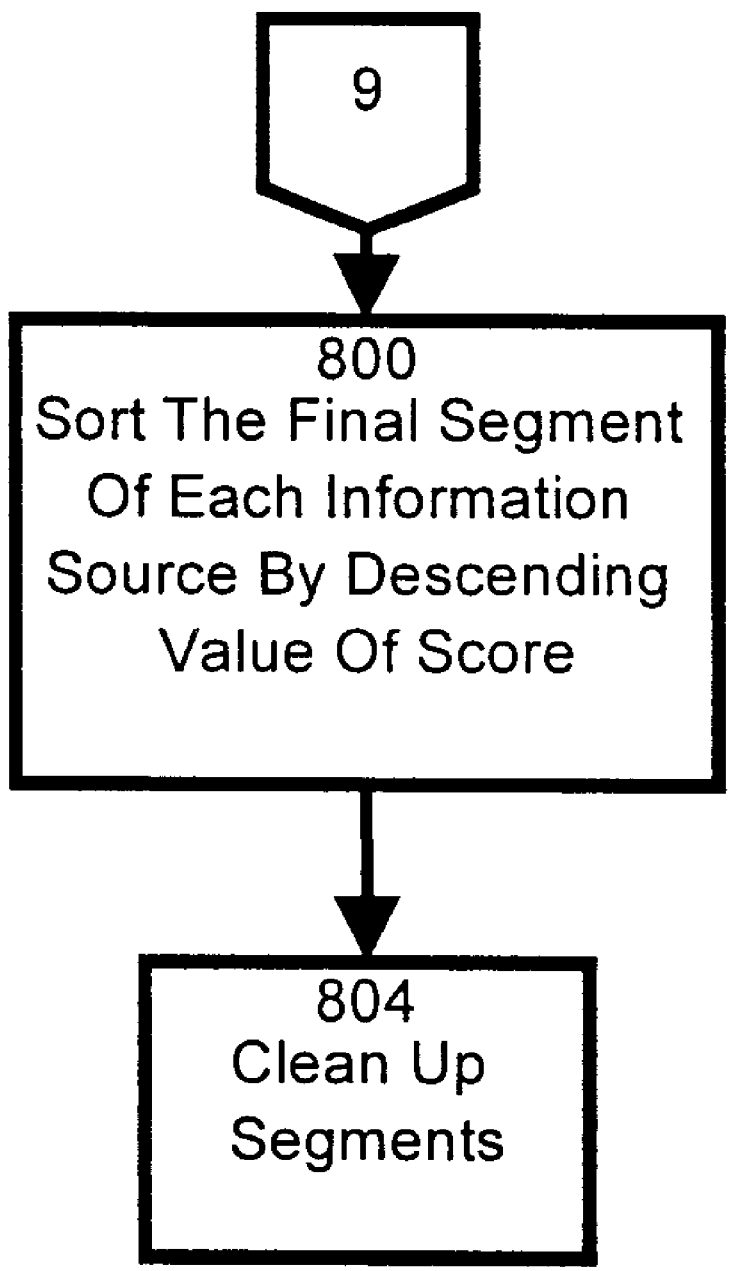

A determination is made at step 768 as to whether any other information sources remain for which a segment of interest has not been determined and, if this is the case, processing reverts to step 708. Otherwise, processing proceeds to step 800, as shown in FIG. 6c.

At step 800 the final segment from each information source is ranked in descending order, by their respective determined scores. At this point, it is likely that these segments define portions of their respective retrieved information sources which are incomplete to some extent, such as only being portions of paragraphs and/or sentences. Further, if the information sources were World Wide Web pages, in HTML format, it is possible that one or more HTML tags are missing from the portions, rendering them unparsable by an HTML browser. Accordingly, at step 804, the final segments are "cleaned up". As this clean up process proceeds, the information source retrieved is modified, if necessary, by moving, adding or deleting information therein.

Figure 7:
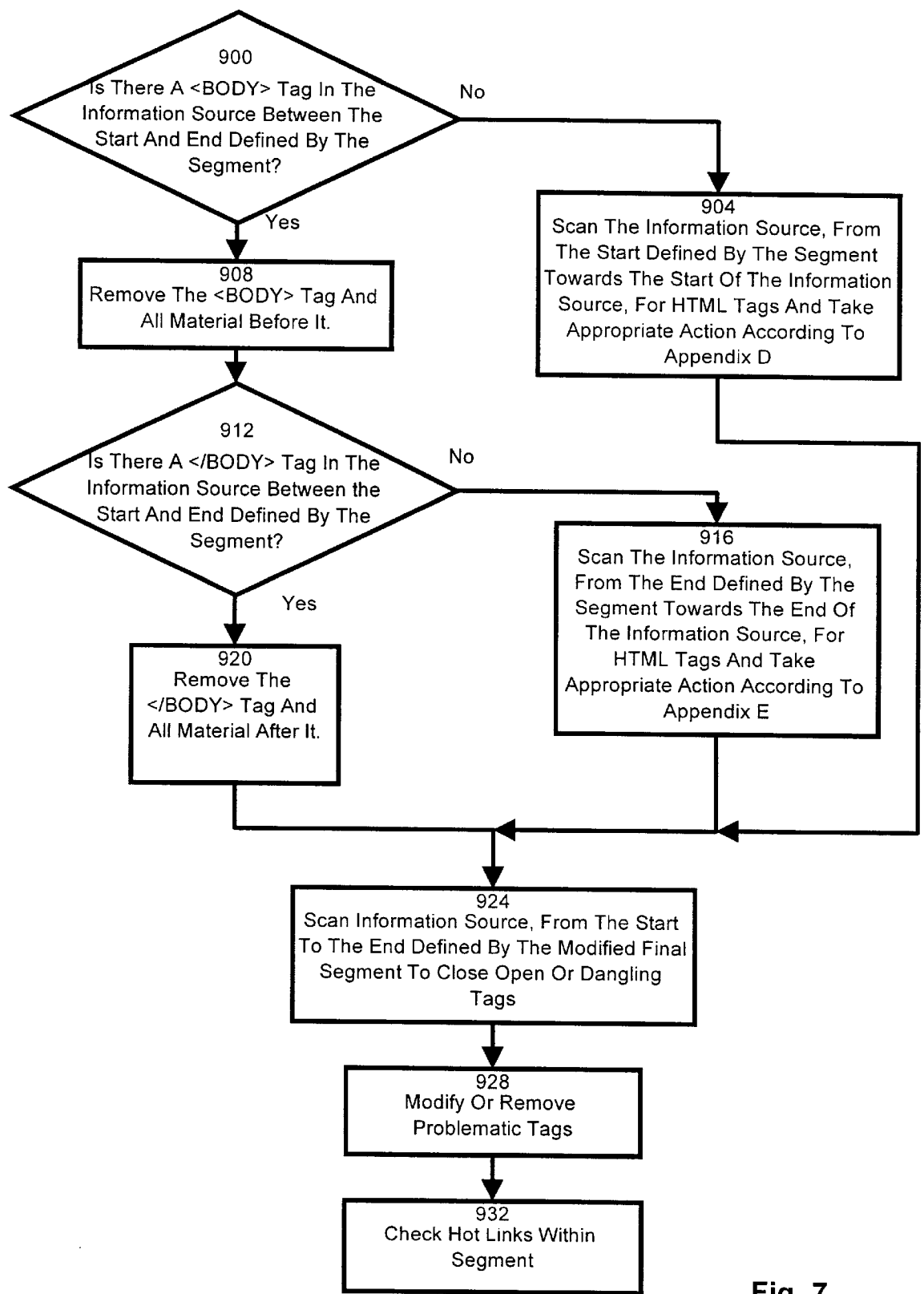
FIG. 7 shows a schematic representation of an HTML clean up step in the selector of FIGS. 6, 6a, 6b and 6c.

Specifically, if the retrieved information sources are HTML formatted files, then the retrieved information source is scanned, as indicated at step 900 in FIG. 7, to determine if a <BODY> tag is present within the portion of the retrieved information source which is between the start and end points defined by the segment. If no such tag is present, then at step 904, the retrieved information source is scanned, commencing at the start defined by the segment and working towards the beginning of the retrieved information source, for HTML tags. For each tag encountered, the actions listed in the table in Appendix D are performed accordingly. For example, if a </CODE> tag is encountered, the tag is moved to the start of the segment and the scan is continued. As another example, if a <DD> tag is encountered, the tag is moved to the start of the segment and the scan is stopped. As another example, if a <TITLE> tag is encountered, the tag is not moved to the start of the segment and the scan stops. In the absence of a tag which stops the scan, the scan terminates when the beginning of the retrieved information source is encountered.

If, at step 908, a <BODY> tag is present, the segment start is updated to exclude the tag and all material before it.

Next, a determination is made at step 912 as to whether the segment includes a </BODY> tag. If no such tag is present, then at step 916, the retrieved information source is scanned, commencing at the end defined by the segment and working towards the end of the retrieved information source, for HTML tags. For each tag encountered, the actions listed in the table in Appendix E are performed accordingly. For example, if a </CAPTION> tag is encountered, the tag is moved to the end of the segment and the scan is continued. As another example, if a </LI> tag is encountered, the tag is moved to the end of the segment and the scan is stopped. As another example, if an <ADDRESS> tag is encountered, the tag is not moved to the end of the segment and the scan stops. In the absence of a tag which stops the scan, the scan terminates when the end of the retrieved information source is encountered.

If, at step 912, it is determined that the segment does include a </BODY> tag, the segment end is updated to exclude the tag and all of the material following it.

Next, at step 924, the "cleaned up" segment is scanned again, from the updated start to the updated end, to close any "open" tags (i.e.—an open tag for which there is no corresponding closing tag, e.g. <CAPTION> without a </CAPTION>) by adding the corresponding closing tag and to open any "dangling" tags (i.e.—closing tags without a corresponding open tag) by adding the corresponding open tag. As will be apparent to those of skill in the art, added closing tags will be added to the end of the segment, in reverse order to the order the corresponding open tags are encountered in the segment and added open tags are added to the beginning of the segment, in reverse order to the order the corresponding closing tags are encountered in the segment.

Next, at step 928, problematic tags are modified or removed in accordance with the table in Appendix F. Specifically, the segment is checked for any filenames present with tags, such as <a> or <IMG> tags, which are expressed in with relative names, i.e.—not with full universal resource locators (URL's). Any such filenames are converted to absolute names, with full URL's. Tags listed in (2) of Appendix F are removed from the information source, along with their contents, and the segment start and end are updated appropriately. Tags listed in (3) of Appendix F are removed from the information source, leaving their contents. Finally, the specific tags listed in (4) of Appendix F are altered in the indicated manner.

At step 932, each URL (hot link) within the segment is checked to confirm that it links to a valid/existing information source. If a URL does not link to a valid information source, the URL is "unlinked", but its text is left in place. If the URL does link to a valid information source, a check is performed to determine if one or more of the groups in processed search data 28 are present in the URL or in the information source to which it points. If one or more groups are present, this information source is retrieved by Information Retrieval means 50 and processed by Selector means 58. The final segment determined for this retrieved information source is ranked against the final segments previously determined for the other retrieved information sources and is added to the sorted final segments obtained at step 800. The clean up operations of step 804 are then performed on this latest, final segment.

The retrieval of information sources which are linked to previously retrieved information sources is limited to a preselected number of levels of recursion. It is contemplated that this number of levels of recursion will be a selectable parameter, although a suitable number of levels of recursion can be specified as a fixed default, if desired. In a present embodiment of the invention, no recursion (zero levels) is the selected default., but it is contemplated that more levels may be desired in other circumstances.

Figure 8:
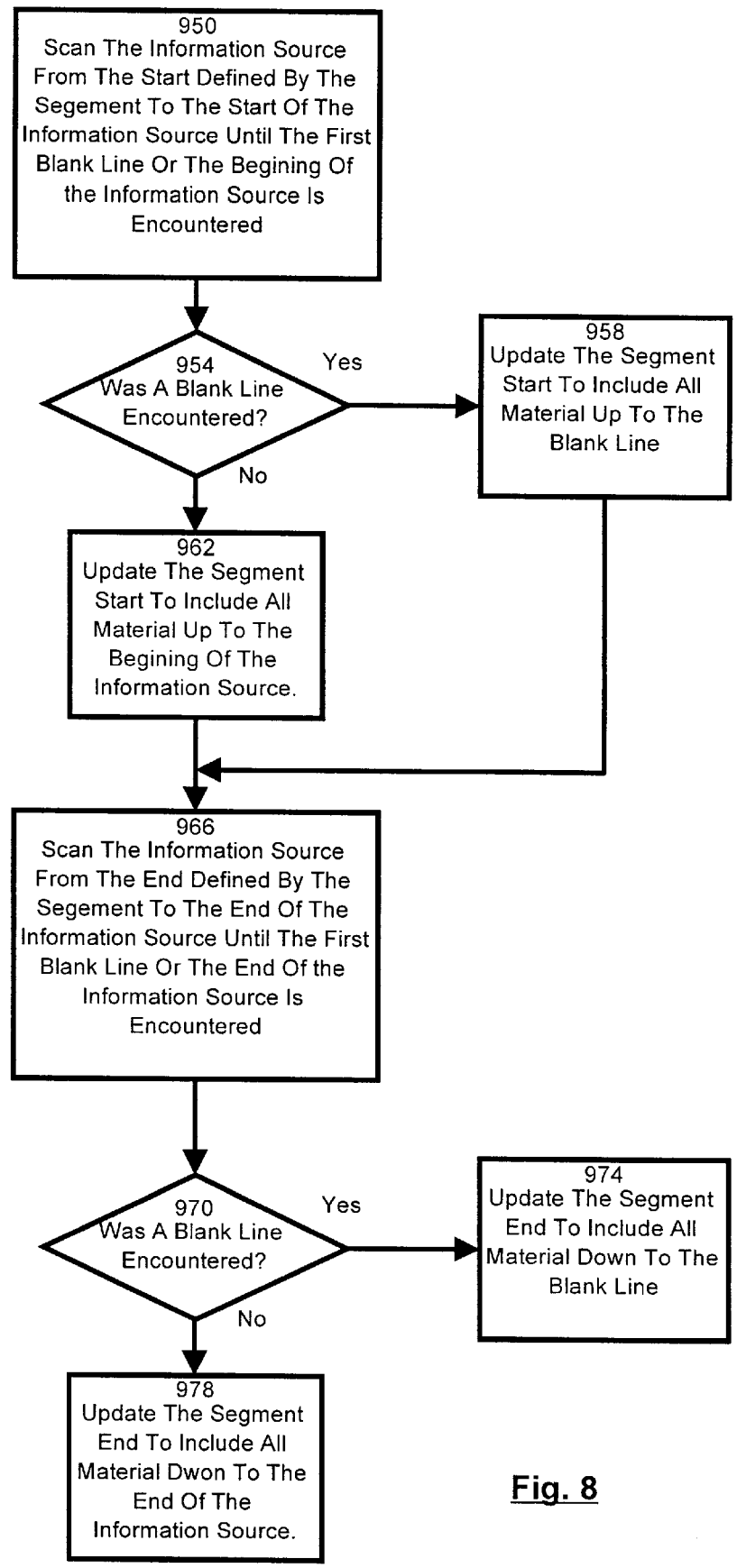
FIG. 8 shows a schematic representation of a text clean up step in the selector of FIGS. 6, 6a, 6b and 6c.

If, at step 804, the information source contains only text, i.e.—is not an HTML document, then the clean up proceeds as shown in FIG. 8. Specifically, at step 950, the information source is scanned, from the start defined by the segment to the start of the information source, until the first blank line is encountered or the start of the information source is reached. If, as determined at step 954, a blank line was encountered, the segment start is updated at step 958 to include all material up to the blank line. If, as determined at step 954, the start of the information source is encountered, the segment start is updated at step 962 to include all material up to the beginning of the source.

Next, at step 966, the information source is scanned, from the end defined by the segment to the end of the information source, until the first blank line is encountered or the end of the information source is reached. If, as determined at step 970, a blank line was encountered, the segment end is updated at step 974 to include all material down to the blank line. If, as determined at step 966, the end of the information source is encountered, the segment end is updated at step 978 to include all material down to the end of the source.

As will be apparent to those of skill in the art, if information sources in formats other than text or HTML are retrieved, appropriate clean up operations will be performed, as desired.

As a final step of Selector means 58, the highest ranked, "cleaned up" segment is selected for output to the user, as is each cleaned up segment whose score is no less than a preselected level. In a present embodiment of the invention, up to the ten highest scoring segments whose scores are greater than 0.01 are output to the user as a first set and a second set of up to the next ten highest scoring segments whose scores are greater than 0.01 are also available for output to the user. As will be apparent to those of skill in the art, the selection of this output criteria is arbitrary and may be varied as desired but this criteria has been found to provide reasonable results.

Output device 62 then outputs the portions 66 of the cleaned up information sources indicated by the selected segments to the user. In a present embodiment of the invention, the output portions include a header which identifies the ranking of the portion, a link (URL) to the original information source (if appropriate), a number indicating the size of the original information source and a link (if appropriate) to the Search Engine 36 with which the information source was found.

An example of the operation of an embodiment of the present invention is given below. In the example, the user has entered "Where do Monarch butterflies spend the winter?" as the Natural Language Search Data 28. The processed search data from the Natural Language Query Processor 24 is "rank1(Monarch) phrase(butterflies spend) phrase (winter)" and this is passed to meta search engine 32.

In this example, a set of search engines 36 has been previously selected and includes the Lycos, AltaVista and Excite engines. Meta search engine 32 simplifies the processed search data 28 for each search engine in the set to obtain simplified search data appropriate to each engine. Specifically, for the Lycos engine, the search data which is dispatched is, "Monarch+butterflies+spend+winter". For the AltaVista search engine, the search data is, "Monarch+AND+(butterflies+OR+spend)+AND+(winter) Monarch ranked first". Finally, for the Excite search engine, the search data is, "Monarch+AND+(butterflies+OR+spend)+AND+(winter)". This search data is appropriately combined with the URL for each respective search engine and is transmitted to the search engine.

Again, in this example it has been previously decided that no more that the first twenty 'hits' from each search engine will be considered. Appendix G shows the actual HTML pages returned by each search engine and Appendix H shows the list of URL's which have been extracted from the pages in Appendix G, after obvious redundancies have been eliminated. In the Appendix, the URL's located by the AltaVista engine are identified with a "av##" prefix, those located by the Lycos engine are identified with a "ly##" prefix and those located by the Excite engine are identified with a "ex##" prefix. As will be noted, there was one redundant 'hit' in the first twenty URL's located by AltaVista, resulting in only nineteen entries for AltaVista in the list of Appendix G. Similarly, there were two redundant 'hits' in the first twenty URL's located by Lycos, resulting in only eighteen entires for Lycos in the list of Appendix G. In the cases wherein a redundancy is determined between the hits returned by two or more search engines, the highest ranked hit is retained and the other hit or hits are removed from the search engine results wherein they were lower scored. For example, if the Lycos search engine ranked a hit as being number two and Excite ranked the same hit as being number ten, and AltaVista ranked the same hit as being number seven, the Lycos hit is retained and the other two hits are removed from the hit lists.

Information retrieval means 50 then retrieves each of the information sources listed in Appendix G, if possible, and these retrieved information sources are processed by Selector means 58 to obtain the list of cleaned up final segments shown in Appendix I. This list includes the URL to retrieve the information source, the start and end points of the cleaned up segment (expressed as byte offsets from the beginning of the information source), and the score assigned to the information source by Selector means 58.

Appendix J shows the formatted text (converted from the raw HTML code) of two of the information sources retrieved from the information source listed in Appendix G and Appendix K shows the final segments from these information sources, as output to the user by output means 62.

As discussed above, the present invention allows a user to input a natural language query, search multiple and diverse databases, retrieve a plurality of information sources which are deemed relevant to the user's query and to extract the relevant portions of at least some of the information sources and present them to the user. It is contemplated that the present invention will assist the user by culling many information sources which are not relevant to the query and by extracting the relevant portions of the relevant information sources. Thus, the user will be presented with a concise selection of information which is relevant to the original query.

The above-described embodiments of the invention are intended to be examples of the present invention and alterations and modifications may be effected thereto, by those of skill in the art, without departing from the scope of the invention which is defined solely by the claims appended hereto.

TABLE 1

Appendix A

| | | | |
|---|---|---|---|
| I'm after | I need | all about | all of |
| all on | any of | available about | available at |
| available in | available on | available to | both of |
| example from | example of | examples from | examples of |
| find out | Find Out | find out about | Find out about |
| go about | happened at | happened in | happened on |
| happened to | happens at | happens in | happens on |
| happens to | has in | have in | how much |
| How much | included in | information about | information from |
| information on | know about | known about | list of |
| lists of | mention of | more about | more of |
| more on | name of | names of | need to know |
| overview of | some of | summary about | summary from |
| summary of | summary on | taken by | tell me about |
| Tell me about | the heck | things about | we're after |
| We're after | | | |

TABLE 2

Appendix A

| | | | | | |
|---|---|---|---|---|---|
| I | I'd | I'll | I'm | a | all |
| am | an | any | are | as | ask |
| available | be | been | being | both | but |
| call | called | can | can't | did | do |
| does | doesn't | don't | example | examples | explain |
| find | following | get | gets | getting | give |
| got | gotten | had | happened | happens | has |
| have | he | her | hers | him | his |
| how | how's | if | include | included | includes |
| including | info | information | irregardless | is | it |
| it's | its | know | like | list | lists |
| look | many | may | me | mention | might |
| more | my | name | named | names | no |
| nor | not | one | our | ours | over- |
| really | regardless | she | should | show | view |
| such | summary | take | taken | tell | some |
| that | the | their | them | there | tells |
| they | thing | things | this | took | there's |
| was | we | we'd | we'll | were | want |
| what's | when | when's | where | where's | what |
| who's | whose | why | why's | will | who |
| would | you | your | | | won't |

TABLE 3

Appendix A

| | |
|---|---|
| and | or |

TABLE 4

| | | | | |
|---|---|---|---|---|
| about | around | at | between | by |
| for | from | in | into | of |
| on | onto | over | to | unto |
| with | | | | |

TABLE 5

| | | | | |
|---|---|---|---|---|
| antique | architectural | bad | best | better |
| big | bigger | biggest | black | blue |
| brown | different | eight | electronic | fall |
| fast | fastest | five | four | good |
| green | grey | high | highest | high-tech |
| identical | large | larger | largest | least |
| little | long | longest | longer | low |
| lowest | most | natural | nine | official |
| one | orange | poor | purple | red |

TABLE 5-continued

| | | | | |
|---|---|---|---|---|
| seven | short | shorter | shortest | six |
| slow | slowest | spring | standard | summer |
| ten | three | two | unique | unofficial |
| various | violet | white | widely | winter |
| worse | worst | yellow | | |

TABLE 6

Appendix A

| | | | | |
|---|---|---|---|---|
| How | What | When | Where | Who |
| Why | how | what | when | where |
| who | why | | | |

Appendix B

| Classification | Whole Group | Individual Words in Group |
|---|---|---|
| rank1() | 10 | 10/(n + 1) |
| quote() | 7 | 2/(2*n + 1) |
| capital() | 7 | 7/(2*n + 1) |
| phrase() | 5 | 5/(n + 1) |
| number() | 3 | n/a |
| qword() | 3 | n/a |
| adject | 3 | 3/(n + 1) | where n is the number of individual words in a group.
Notes:
(1) If a group is classified as rank1(), capital() or quote(); do not count any words in groups classified as prep(), join() or throw() which are within the group.
(2) For a group classified as or(), each group within the or() group is scored separately in accordance with the regime above and the individual scores are added and maintained for the candidate as a whole.

Appendix C

| Classification | Initial Value |
|---|---|
| rank1() | 0.3 |
| capital() | 0.4 |
| quote() | 0.4 |
| phrase() | 0.5 |
| number() | 0.7 |
| adjective() | 0.7 |
| qword() | 0.9 |

Appendix D

| Tag | Action | Continue/Stop Scan |
|---|---|---|
| <!--> | Include this tag. | Continue. |
| </A> | Include this tag. | Continue. |
| </ADDRESS> | Don't include this tag. | Stop. |
| </APPLET> | Don't include this tag. | Stop. |
| </B> | Include this tag. | Continue. |
| </BANNER> | Don't include this tag. | Stop. |
| </BIG> | Include this tag. | Continue. |
| </BLINK> | Include this tag. | Continue. |
| </BLOCKQUOTE> | Don't include this tag. | Stop. |
| </BODY> | Don't include this tag. | Stop. |
| </BQ> | Don't include this tag. | Stop. |
| </CAPTION> | Include this tag. | Continue. |
| </CENTER> | Don't include this tag. | Stop. |
| </CITE> | Include this tag. | Continue. |
| </CODE> | Include this tag. | Continue. |
| </COMMENT> | Include this tag. | Continue. |
| </CREDIT> | Include this tag. | Continue. |

Appendix D

| Tag | Action | Continue/Stop Scan |
|---|---|---|
| </DD> | Don't include this tag. | Stop. |
| </DFN> | Include this tag. | Continue. |
| </DIR> | Don't include this tag. | Stop. |
| </DIV> | Don't include this tag. | Stop. |
| </DL> | Don't include this tag. | Stop. |
| </DT> | Don't include this tag. | Stop. |
| </EM> | Include this tag. | Continue. |
| </FIG> | Don't include this tag. | Stop. |
| </FN> | Include this tag. | Continue. |
| </FONT> | Include this tag. | Continue. |
| </FORM> | Don't include this tag. | Stop. |
| </FRAMESET> | Don't include this tag. | Stop. |
| </H1> | Include this tag. | Continue. |
| </H2> | Include this tag. | Continue. |
| </H3> | Include this tag. | Continue. |
| </H4> | Include this tag. | Continue. |
| </H5> | Include this tag. | Continue. |
| </H6> | Include this tag. | Continue. |
| </HEAD> | Don't include this tag. | Stop. |
| </HTML> | Don't include this tag. | Stop. |
| </I> | Include this tag. | Continue. |
| </IMG> | Include this tag. | Continue. |
| </IFRAME> | Include this tag. | Continue. |
| </KBD> | Include this tag. | Continue. |
| </LH> | Include this tag. | Continue. |
| </LI> | Don't include this tag. | Stop. |
| </LISTING> | Don't include this tag. | Stop. |
| </MAP> | Don't include this tag. | Stop. |
| </MARQUEE> | Don't include this tag. | Stop. |
| </MENU> | Don't include this tag. | Stop. |
| </MULTICOL> | Don't include this tag. | Stop. |
| </NOBR> | Don't include this tag. | Stop. |
| </NOFRAMES> | Include this tag. | Continue |
| </NOSCRIPT> | Include this tag. | Continue. |
| </NOTE> | Include this tag. | Continue. |
| </OBJECT> | Include this tag. | Continue. |
| </OL> | Don't include this tag. | Stop. |
| </OPTION> | Include this tag. | Continue. |
| </P> | Don't include this tag. | Stop. |
| </PLAINTEXT> | Don't include this tag. | Stop. |
| </PRE> | Don't include this tag. | Stop. |
| </S> | Include this tag. | Continue. |
| </SAMP> | Include this tag. | Continue. |
| </SCRIPT> | Don't include this tag. | Stop. |
| </SELECT> | Include this tag. | Continue. |
| </SMALL> | Include this tag. | Continue. |
| </SPAN> | Include this tag. | Continue. |
| </STRIKE> | Include this tag. | Continue. |
| </STRONG> | Include this tag. | Continue. |
| </STYLE> | Don't include this tag. | Stop. |
| </SUB> | Include this tag. | Continue. |
| </SUP> | Include this tag. | Continue. |
| </TABLE> | Don't include this tag. | Stop. |
| </TD> | Include this tag. | Continue. |
| </TEXTAREA> | Include this tag. | Continue. |
| </TFOOT> | Don't include this tag. | Stop. |
| </TH> | Include this tag. | Continue. |
| </THEAD> | Don't include this tag. | Stop. |
| </TT> | Include this tag. | Continue. |
| </U> | Include this tag. | Continue. |
| </UL> | Don't include this tag. | Stop. |
| </VAR> | Include this tag. | Continue. |
| </WBR> | Include this tag. | Continue. |
| </XMP> | Don't include this tag. | Stop. |
| <A> | Include this tag. | Continue. |
| <ADDRESS> | Include this tag. | Stop. |
| <APPLET> | Include this tag. | Stop. |
| <AREA> | Include this tag. | Continue. |
| <B> | Include this tag. | Continue. |
| <BANNER> | Include this tag. | Stop. |
| <BASE> | Include this tag. | Continue. |
| <BASEFONT> | Don't include this tag. | Stop. |
| <BGSOUND> | Don't include this tag. | Stop. |
| <BIG> | Include this tag. | Continue. |
| <BLINK> | Include this tag. | Continue. |
| <BLOCKQUOTE> | Include this tag. | Stop. |
| <BODY> | Don't include this tag. | Stop. |
| <BQ> | Include this tag. | Stop. |
| <BR> | Include this tag. | Continue. |
| <CAPTION> | Include this tag. | Continue. |
| <CENTER> | Include this tag. | Stop. |
| <CITE> | include this tag. | Continue. |
| <CODE> | Include this tag. | Continue. |
| <COL> | Include this tag. | Continue. |
| </TITLE> | Don't include this tag. | Stop. |
| </TR> | Don't include this tag. | Stop. |
| <COLGROUP> | Include this tag. | Continue. |
| <COMMENT> | Include this tag. | Continue. |
| <CREDIT> | Include this tag. | Continue. |
| <DD> | Include this tag. | Stop. |
| <DFN> | Include this tag. | Continue. |
| <DIR> | Include this tag. | Stop. |
| <DIV> | Include this tag. | Stop. |
| <DL> | Include this tag. | Stop. |
| <DT> | Include this tag. | Stop. |
| <EM> | Include this tag. | Continue. |
| <EMBED> | Include this tag. | Continue. |
| <FIG> | Include this tag. | Stop. |
| <FN> | Include this tag. | Continue. |
| <FONT> | Include this tag. | Continue. |
| <FORM> | Include this tag. | Stop. |
| <FRAME> | Include this tag. | Continue. |
| <FRAMESET> | Include this tag. | Stop. |
| <H1> | Include this tag. | Stop. |
| <H2> | Include this tag. | Stop. |
| <H3> | Include this tag. | Stop. |
| <H4> | Include this tag. | Stop. |
| <H5> | Include this tag. | Stop. |
| <H6> | Include this tag. | Stop. |
| <HEAD> | Don't include this tag. | Stop |
| <HR> | Don't include this tag. | Stop. |
| <HTML> | Don't include this tag. | Stop. |
| <I> | Include this tag. | Continue. |
| <IFRAME> | Include this tag. | Continue. |
| <IMG> | Include this tag. | Continue. |
| <INPUT> | Include this tag. | Continue. |
| <KBD> | Include this tag. | Continue. |
| <LH> | Include this tag. | Continue. |
| <LI> | Include this tag. | Stop. |
| <LINK> | Include this tag. | Continue. |
| <LISTING> | Include this tag. | Stop. |
| <MAP> | Include this tag. | Stop. |
| <MARQUEE> | Include this tag. | Stop. |
| <MENU> | Include this tag. | Stop. |
| <MULTICOL> | Include this tag. | Stop. |
| <NEXTID> | Include this tag. | Continue. |
| <NOBR> | Include this tag. | Stop. |
| <NOFRAMES> | Include this tag. | Continue. |
| <NOSCRIPT> | Include this tag. | Continue. |
| <NOTE> | Include this tag. | Continue. |
| <OBJECT> | Include this tag. | Continue. |
| <OL> | Include this tag. | Stop. |
| <OPTION> | Include this tag. | Continue. |
| <OVERLAY> | Include this tag. | Continue. |
| <P> | Include this tag. | Stop. |
| <PARAM> | Include this tag. | Continue. |
| <PLAINTEXT> | Include this tag. | Stop. |
| <PRE> | Include this tag. | Stop. |
| <RANGE> | Include this tag. | Continue. |
| <S> | Include this tag. | Continue. |
| <SAMP> | Include this tag. | Continue. |
| <SCRIPT> | Include this tag. | Stop. |
| <SELECT> | Include this tag. | Continue. |
| <SMALL> | Include this tag. | Continue. |
| <SPACER> | Include this tag. | Continue. |
| <SPAN> | Include this tag. | Continue. |
| <SPOT> | Include this tag. | Continue. |
| <STRIKE> | Include this tag. | Continue. |
| <STRONG> | Include this tag. | Continue. |
| <STYLE> | Include this tag. | Stop. |
| <SUB> | Include this tag. | Continue. |
| <SUP> | Include this tag. | Continue. |

Appendix D

| Tag | Action | Continue/Stop Scan |
|---|---|---|
| <TAB> | Include this tag. | Continue. |
| <TABLE> | Include this tag. | Stop. |
| <TBODY> | Include this tag. | Stop. |
| <TD> | Include this tag. | Continue. |
| <TEXTAREA> | Include this tag. | Continue. |
| <TFOOT> | Include this tag. | Stop. |
| <TH> | Include this tag. | Continue. |
| <THEAD> | Include this tag. | Stop. |
| <TITLE> | Don't include this tag. | Stop. |
| <TR> | Include this tag. | Stop. |
| <TT> | Include this tag. | Continue. |
| <U> | Include this tag. | Continue. |
| <UL> | Include this tag. | Stop. |
| <VAR> | Include this tag. | Continue. |
| <WBR> | Include this tag. | Continue. |
| <XMP> | Include this tag. | Stop. |
| Any other tags: | Include this tag. | Continue. |

APPENDIX E

| Tag | Action | Continue/Stop Scan |
|---|---|---|
| <!--> | Include this tag. | Continue. |
| </A> | Include this tag. | Continue. |
| </ADDRESS> | Don't include this tag. | Stop. |
| </APPLET> | Don't include this tag. | Stop. |
| </B> | Include this tag. | Continue. |
| </BANNER> | Don't include this tag. | Stop. |
| </BIG> | Include this tag. | Continue. |
| </BLINK> | Include this tag. | Continue. |
| </BLOCKQUOTE> | Don't include this tag. | Stop. |
| </BODY> | Don't include this tag. | Stop. |
| </BQ> | Don't include this tag. | Stop. |
| </CAPTION> | Include this tag. | Continue. |
| </CENTER> | Don't include this tag. | Stop. |
| </CITE> | Include this tag. | Continue. |
| </CODE> | Include this tag. | Continue. |
| </COMMENT> | Include this tag. | Continue. |
| </CREDIT> | Include this tag. | Continue. |
| </DD> | Don't include this tag. | Stop. |
| </DFN> | Include this tag. | Continue. |
| </DIR> | Don't include this tag. | Stop. |
| </DIV> | Don't invlude this tag. | Stop. |
| </DL> | Don't include this tag. | Stop. |
| </DT> | Don't include this tag. | Stop. |
| </EM> | Include this tag. | Continue. |
| </FIG> | Don't include this tag. | Stop |
| </FN> | Include this tag. | Continue. |
| </FONT> | Include this tag. | Continue. |
| </FORM> | Don't include this tag. | Stop. |
| </FRAMESET> | Don't include this tag. | Stop. |
| </H1> | Include this tag. | Continue. |
| </H2> | Include this tag. | Continue. |
| </H3> | Include this tag. | Continue. |
| </H4> | Include this tag. | Continue. |
| </H5> | Include this tag. | Continue. |
| </H6> | Include this tag. | Continue. |
| </HEAD> | Don't include this tag. | Stop. |
| </HTML> | Don't include this tag. | Stop. |
| </I> | Include this tag. | Continue. |
| </IMG> | Include this tag. | Continue. |
| </IFRAME> | Include this tag. | Continue. |
| </KBD> | Include this tag. | Continue. |
| </LH> | Include this tag. | Continue. |
| </LI> | Don't include this tag. | Stop. |
| </LISTING> | Don't include this tag. | Stop. |
| </MAP> | Don't include this tag. | Stop. |
| </MARQUEE> | Don't include this tag. | Stop. |
| </MENU> | Don't include this tag. | Stop. |
| </MULTICOL> | Don't include this tag. | Stop. |
| </NOBR> | Don't include this tag. | Stop. |
| </NOFRAMES> | Include this tag. | Continue. |
| </NOSCRIPT> | Include this tag. | Continue. |

APPENDIX E

| Tag | Action | Continue/Stop Scan |
|---|---|---|
| </NOTE> | Include this tag. | Continue. |
| </OBJECT> | Include this tag. | Continue. |
| </OL> | Don't include this tag. | Stop. |
| </OPTION> | Include this tag. | Continue. |
| </P> | Don't include this tag. | Stop. |
| </PLAINTEXT> | Don't include this tag. | Stop. |
| </PRE> | Don't include this tag. | Stop. |
| </S> | Include this tag. | Continue. |
| </SAMP> | Include this tag. | Continue. |
| </SCRIPT> | Don't include this tag. | Stop. |
| </SELECT> | Include this tag. | Continue. |
| </SMALL> | Include this tag. | Continue. |
| </SPAN> | Include this tag. | Continue. |
| </STRIKE> | Include this tag. | Continue. |
| </STRONG> | Include this tag. | Continue. |
| </STYLE> | Don't include this tag. | Stop. |
| </SUB> | Include this tag. | Continue. |
| </SUP> | Include this tag. | Continue. |
| </TABLE> | Don't include this tag. | Stop. |
| </TD> | Include this tag. | Continue. |
| </TEXTAREA> | Include this tag. | Continue. |
| </TFOOT> | Don't include this tag. | Stop. |
| </TH> | Include this tag. | Continue. |
| </THEAD> | Don't include this tag. | Stop. |
| </TITLE> | Don't include this tag. | Stop. |
| </TR> | Don't include this tag. | Stop. |
| </TT> | Include this tag. | Continue. |
| </U> | Include this tag. | Continue. |
| </UL> | Don't include this tag. | Stop. |
| </VAR> | Include this tag. | Continue. |
| </WBR> | Include this tag. | Continue. |
| </XMP> | Don't include this tag. | Stop. |
| <A> | Include this tag. | Continue. |
| <ADDRESS> | Include this tag. | Stop. |
| <APPLET> | Include this tag. | Stop. |
| <AREA> | Include this tag. | Continue. |
| <B> | Include this tag. | Continue. |
| <BANNER> | Include this tag. | Stop. |
| <BASE> | Include this tag. | Continue. |
| <BASEFONT> | Don't include this tag. | Stop. |
| <BGSOUND> | Don't include this tag. | Stop. |
| <BIG> | Include this tag. | Continue. |
| <BLINK> | Include this tag. | Continue. |
| <BLOCKQUOTE> | Include this tag. | Stop. |
| <BODY> | Don't include this tag. | Stop. |
| <BQ> | Include this tag. | Stop. |
| <BR> | Include this tag. | Continue. |
| <CAPTION> | Include this tag. | Continue. |
| <CENTER> | Include this tag. | Stop. |
| <CITE> | Include this tag. | Continue. |
| <CODE> | Include this tag. | Continue. |
| <COL> | Include this tag. | Continue. |
| <COLGROUP> | Include this tag. | Continue. |
| <COMMENT> | Include this tag. | Continue. |
| <CREDIT> | Include this tag. | Continue. |
| <DD> | Include this tag. | Stop. |
| <DFN> | Include this tag. | Continue. |
| <DIR> | Include this tag. | Stop. |
| <DIV> | Include this tag. | Stop. |
| <DL> | Include this tag. | Stop. |
| <DT> | Include this tag. | Stop. |
| <EM> | Include this tag. | Continue. |
| <EMBED> | Include this tag. | Continue. |
| <FIG> | Include this tag. | Stop. |
| <FN> | Include this tag. | Continue. |
| <FONT> | Include this tag. | Continue. |
| <FORM> | Include this tag. | Stop. |
| <FRAME> | Include this tag. | Continue. |
| <FRAMESET> | Include this tag. | Stop. |
| <H1> | Include this tag. | Stop. |
| <H2> | Include this tag. | Stop. |
| <H3> | Include this tag. | Stop. |
| <H4> | Include this tag. | Stop. |
| <H5> | Include this tag. | Stop. |
| <H6> | Include this tag. | Stop. |
| <HEAD> | Don't include this tag. | Stop |

APPENDIX F

| Tag | Action | Continue/Stop Scan |
|---|---|---|
| <HR> | Don't include this tag. | Stop. |
| <HTML> | Don't include this tag. | Stop. |
| <I> | Include this tag. | Continue. |
| <IFRAME> | Include this tag. | Continue. |
| <IMG> | Include this tag. | Continue. |
| <INPUT> | Include this tag. | Continue. |
| <KBD> | Include this tag. | Continue. |
| <LH> | Include this tag. | Continue. |
| <LI> | Include this tag. | Stop. |
| <LINK> | Include this tag. | Continue. |
| <LISTING> | Include this tag. | Stop. |
| <MAP> | Include this tag. | Stop. |
| <MARQUEE> | Include this tag. | Stop. |
| <MENU> | Include this tag. | Stop. |
| <MULTICOL> | Include this tag. | Stop. |
| <NEXTID> | Include this tag. | Continue. |
| <NOBR> | Include this tag. | Stop. |
| <NOFRAMES> | Include this tag. | Continue. |
| <NOSCRIPT> | Include this tag. | Continue. |
| <NOTE> | Include this tag. | Continue. |
| <OBJECT> | Include this tag. | Continue. |
| <OL> | Include this tag. | Stop. |
| <OPTION> | Include this tag. | Continue. |
| <OVERLAY> | Include this tag. | Continue. |
| <P> | Include this tag. | Stop. |
| <PARAM> | Include this tag. | Continue. |
| <PLAINTEXT> | Include this tag. | Stop. |
| <PRE> | Include this tag. | Stop. |
| <RANGE> | Include this tag. | Continue. |
| <S> | Include this tag. | Continue. |
| <SAMP> | Include this tag. | Continue. |
| <SCRIPT> | Include this tag. | Stop. |
| <SELECT> | Include this tag. | Continue. |
| <SMALL> | Include this tag. | Continue. |
| <SPACER> | Include this tag. | Continue. |
| <SPAN> | Include this tag. | Continue. |
| <SPOT> | Include this tag. | Continue. |
| <STRIKE> | Include this tag. | Continue. |
| <STRONG> | Include this tag. | Continue. |
| <STYLE> | Include this tag. | Stop. |
| <SUB> | Include this tag. | Continue. |
| <SUP> | Include this tag. | Continue. |
| <TAB> | Include this tag. | Continue. |
| <TABLE> | Include this tag. | Stop. |
| <TBODY> | Include this tag. | Stop. |
| <TD> | Include this tag. | Continue. |
| <TEXTAREA> | Include this tag. | Continue. |
| <TFOOT> | Include this tag. | Stop. |
| <TH> | Include this tag. | Continue. |
| <THEAD> | Include this tag. | Stop. |
| <TITLE> | Don't include this tag. | Stop. |
| <TR> | Include this tag. | Stop. |
| <TT> | Include this tag. | Continue. |
| <U> | Include this tag. | Continue. |
| <UL> | Include this tag. | Stop. |
| <VAR> | Include this tag. | Continue. |
| <WBR> | Include this tag. | Continue. |
| <XMP> | Include this tag. | Stop. |
| Any other tags: | Include this tag. | Continue. |

APPENDIX (1) Replace any filenames with the segments (e.g., within <A> or <IMG>) that are specified with relative names (i.e., not full URLs) with the appropriate full URLs.
(2) Remove the following tags and their contents:
<! . . . >
<BASEFONT . . . >
<COMMENT . . . >
<META . . . >
<FRAMESET . . . > </FRAMESET>
<TITLE> </TITLE>
<HEAD> </HEAD>
<LINK . . . >
<NEXTID . . . >
(3) Remove the following tags, but keep their contents:
<DIV . . . > </DIV>
<HTML> </HTML>
<SPAN . . . > </SPAN>
(4) Alter the following tags in the given manner:

| | |
|---|---|
| <APPLET . . . > </APPLET> -- | Replace the entire tag with an APPLET icon which is linked to the entire source document. |
| <BGSOUND . . . > -- | Replace the entire tag with a SOUND icon which is linked to the particular sound. |
| <EMBED . . . > -- | Replace the entire tag with an EMBED icon which is linked to the entire source document. |
| <IMG . . . > -- | Replace the entire tag with an IMAGE icon which is linked to the particular image. |
| <MARQUEE . . . > </MARQUEE> -- | Replace the entire tag with a MARQUEE icon which is linked to the entire document. |
| <OBJECT . . . > </OBJECT> -- | Replace the entire tag with an OBJECT icon which is linked to the entire document. |
| <SCRIPT . . . > </SCRIPT> -- | Replace the entire tag with a SCRIPT icon which is linked to the entire document. |

APPENDIX G

AltaVist Search results:

Word count: Monarch: 19925
Documents 1–10 of about 300 matching the query, best matches first.
*Danaus plexippus* [Monarch Butterfly]
*Danaus plexippus*. Monarch Butterfly. ˆ Classification. Phylum: Arthropoda. Class: Insecta. Order: Lepidoptera. Family: Nymphalidae. Table of Contents . . . .
http://www.oit.itd.umich.edu/bio/doc.cgi/Arthropoda/Insecta/Lepidoptera/Nymphalidae/Danaus_plexippus.ftl - size 9K - 1 Jul 96
Monarch Butterfly
STATE INSECT - MONARCH BUTTERFLY *Danaus plexippus*. The monarch was chosen in 1975 to be Illinois' state insect. The third grade classes at Dennis School . . .
http://dnr.state.il.us/NREDU/CLASSRM/symbol/insect.htm - size 2K - 29 Apr 96
Monarch Watch: Tracking the journey
Monday, September 30, 1996. Monarch Watch: Tracking the journey. Internet resources. At left:Yuna Asriyan, left, Joe Nguyen and other fourth graders watch.
http://www.portland.net/ph/monews/story2.htm - size 10K - 30 Sep 96
Control of Monarch Parasite
How Do I Control the Monarch Parasite? Dear Fellow Monarch Raiser: Many of us are distributing monarch butterflies as a means to excite the public, . . .
http://monarch.bio.ukans.edu/parasitecontrol - size 9K - 5 Apr 96
The Blake School: Monarch Butterfly Project, Research9
Habitat Status of Monarch Butterflies in Mexico and the U.S. Morgan Steiner. Deforestation in Mexico is a major problem for the habitat of the monarch . . .
http://www.blake.pvt.k12.mn.us/campus/projects/upper/monarchs/research/steiner1.html - size 2K - 2 Mar 96
Journey North: Monarch Butterfly Updates
Journey North News. Monarch Butterfly Migration Update:
April 16, 1996.
Only five new monarch sightings were reported this week! Again, biologists Dr. . . . .
http://www.ties.k12.mn.us/~jnorth/critters/monarch/829680914.html - size 9K - 16 Apr 96
Journey North: Monarch Butterfly Updates
Journey North News. Monarch Migration Update: April 9, 1996. Our Internet Field Team is hard at work! There are many, many monarchs to map this week! By . . .
http://www.ties.k12.mn.us/~jnorth/critters/monarch/829061947.html - size 13K - 9 Apr 96

APPENDIX G

Journey North: Monarch Butterfly Updates
Journey North News. Monarch Migration Update: March 26, 1996. A few new monarch sightings were reported this week. Here's a chart summarizing this . . .
http://www.ties.k12.mn.us/~jnorth/critters/monarch/827853714.html size 10K - 26 Mar 96
Monarch Migration
Journey North's 3rd Annual Spring Monarch Migration Project Get ready! You're invited to take part in an international science project with students and . . .
http://bvsd.k12.co.us/monarch.html - size 4K - 17 Jun 96
Journey North: Monarch Butterfly Updates
Journey North News. Deforestation and the Monarch Butterfly Reserves. by Liz Olson, Grade 11, The Blake Schools. One of the major issues that has arisen . . .
http://www.ties.k12.mn.us/~jnorth/critters/monarch/826042770.html - size 4K - 5 Mar 96
p. 1 2 3 4 5 6 7 8 9 10 11 12 13 14 15 16 17 18 19 20 [Next]
--------------------------------------------------------------------
Search and Display the Results
Selection Criteria: Please use Advanced Syntax (AND, OR, NOT, NEAR).
Results Ranking Criteria: Documents containing these words will be listed first.
Start date: End date: e.g. 21/Mar/96
--------------------------------------------------------------------
Surprise . Legal. FAQ . Add URL . Feedback . Text-Only
--------------------------------------------------------------------
Copyright - 1996 Digital Equipment Corporation. All rights reserved.
Word count: Monarch: 19925 (second page)
Documents 11–20 of about 300 matching the query, best matches first.
Monarch Detectives
Discovery of the Monarch Migration. Monarchs at an overwintering site in central Mexico. Research of the monarch migration and biology began around 1857 . . .
http://monarch.bio.ukans.edu/migrtnhist.html - size 4K - 5 Apr 96
The Blake School: Monarch Butterfly Project, Field Reports8
Field Report: Monarch Mortality Estimates from the December Snowfall. By Todd Stiefler. December 30, 1995 a snowstorm hit Central Mexico dropping . . .
http://www.blake.pvt.k12.mn.us/campus/projects/upper/monarchs/reports/report8.html - size 4K - 14 Jun 96
The Monarch Butterfly
Monarch Butterfly. Did you know the bluejay is afraid of the male Monarch? They're also noctunal. The order of all butterflies is Lepidoptera, and they . . .
http://info.csd.org:70/WWW/schools/pattonville/insect.museum/butterfly.h
tml - size 3K - 4 Mar 96
Monarch Butterfly Migration
The Migratory Behavior of the Monarch Butterfly. Karen Hanson Nicki Nguyen Hien To. I. Introduction: The awesome sight of hundreds of monarch butterflies.
http://genbiol.cbs.umn.edu/1009/1009h/monarchs.html - size 12K - 28 May 96
Guide to Pismo Beach - Monarch Butterflies
Pismo Beach - Monarch Butterflies. The "Butterfly Trees" of Pismo Beach are an added attraction to the city. From late November through February, . . .
http://dial.net/pismo/monarch - size 6K - 21 Jun 96
Journey North: Monarch Butterflies Migration
Monarch Butterflies Migration Updates will be posted on: Tuesdays. Background Information. Migration Data Table. Journey North News. Monarch Butterflies . . .
http://www.ties.k12.mn.us/~jnorth/critters/monarch/ - size 5K - 30 May 96
Pismo Beach Guide - Monarch Butterflies
Pismo Beach - Monarch Butterflies. The "Butterfly Trees" of Pismo Beach are an added attraction to the city. From late Novemher through February, . . .
http://webmill.com/pismo/monarch - size 6K - 19 Jun 96
Follow the Monarch Butterfly Migration
Follow the Monarch Butterfly Migration. Mexico. Nature Observation. Click on an image to see it in full view: Every autumn, . . .
http://www.deepriver.com/adven/htm/181.htm - size 4K - 11 Jan 96
Monarch migration
Where do Monarchs Go for Winter? A view of an oyamel (fir) forest on Sierra Chincua near Angangueo in central Mexico. Toward the end of summer (late . . .
http://monarch.bio.ukans.edu/migration.html - size 6K - 5 Apr 96

APPENDIX G

Texas Monarch Watch
Texas Monarch Watch Nongame Program Texas Parks and Wildlife 4200 Smith School Road Austin, TX 78744. The Texas Monarch Watch. The Texas Monarch Watch is . . .
http://monarch.bio.ukans.edu/texasmw.html - size 19K - 5 Apr 96
[Prev] p. 1 2 3 4 5 6 7 8 9 10 11 12 13 14 15 16 17 1819 20 [Next]
--------------------------------------------------------------------
Search and Display the Results
Selection Criteria: Please use Advanced Syntax (AND, OR, NOT, NEAR).
Results Ranking Criteria: Documents containing these words will be listed first.
Start date: End date: e.g. 21/Mar/96
--------------------------------------------------------------------
Surprise . Legal . FAQ . Add URL . Feedback . Text-Only
--------------------------------------------------------------------
Copyright - 1996 Digital Equipment Corporation. All rights reserved.
Excite!Search results:

Search Menu
New Search
Advanced Search
Add URL
Excite and AOL Sign Exclusive Agreement
Check out our advertiser: Click Here
Excite Search found 926 documents about: Monarch AND (butterflies OR spend) AND (winter).
Check out Reviews!
Arts
Business
Computing
Education
Entertainment
Health
Hobbies
Life & Style
Money
News
Personal Pages
Politics & Law
Regional
Science
Shopping
Sports
--------------------------------------------------------------------
Did You Know?
Search results are sorted by relevance, indicated by a percentage rating. Click 'Sort by Site' to see which websites have the most documents.
--------------------------------------------------------------------
Go To
Excite Home
Excite Search
Excite Reviews
Excite City.Net
Excite Live
Excite Reference
Excite Tours
Info
Help
Feedback
Advertising
Credits
About Excite
--------------------------------------------------------------------
Did you know?
Click on 'More Like This' to see more documents that pertain to your search.
--------------------------------------------------------------------
Excite Search is sponsored in part by Sun Microsystems and run on 10-CPU Ultra Enterprise 4000 servers.
--------------------------------------------------------------------
Documents 1–10 sorted by confidence
92% Travel - George H Winslow, Jr. [More Like This]
URL: http://home.forbin.com/~gwinslow/travel.html
Summary: With the coming of fall I am reminded that the Monarch butterflies are starting their annual migration to their winter hibernation grounds. When we arrived at the sanctuary we found approximately 5–7 million butterflies in just a few square miles of

APPENDIX G mountain top.
92% Butterflies Page [More Like This]
URL: http://www.oise.on.ca/~lasullivan/butterfiies.html
Summary: If you are a student in grades 4–6 looking for information to create a project on butterflies you are looking in the right place! .)
Save The Butterfly (Dedicated to saving butterflies around the world) A New Butterfly Conservatory (A great place to visit if you have a graphic browser).
92% Monarch Butterfly [More Like This]
URL: http://www.tnc.org./infield/species/monarch/monarch.htm
Summary: Burnt orange, up to 4 inches across with black markings, Monarchs can be found virtually anywhere in the United States. In late September, for instance, they begin to congregate at Cache River Joint Wetlands Project in Illinois, a Conservancy preserve, and move southward for their annual migration.
91% Follow the Monarch Butterfly Migration [More Like This]
URL: http://www.deepriver.com/adven/htm/181.htm
Summary: Click on an image to see it in full view: Every autumn, millions of monarch butterflies from North American begin an incredible migration, journeying south to spend the winter in central Mexico. The forests, which for centuries have been the winter haven of these butterflies, are now threatened by loggers.
91% On Six Legs Flies of the Butter Season S . . . [More Like This]
URL:
http://hermes.ecn.purdue.edu:8001/gopher_dir/The%20Purdue%20
Cooperative%20Extension%20Gopher%20Information%20Server/
Current%20News/Archives/96/A pr/04–26/OSL:%20Flies%20of%
20the%20Butter%20Season
Summary: http://bloodshot.com:80/babble/puppy/candle.html
91% Illinois State Insect [More Like This]
URL: http://www.museum.state.il.us:70/exhibits/symbols/insect.html
Summary: Some monarchs remain in the vicinity of their breeding grounds; others fly north to lay eggs. If this was of interest, you might be interested in these other Internet resources on monarchs and other insects.
91% Monarch Watch [More Like This]
URL: http://monarch.bio.ukans.edu/
Summary: Enjoy your visit, and come back often - we will be continually updating many areas. Please feel free to contact us if you are interested in receiving more information about the Monarch Watch or are interested in participating in the fall tagging.
91% K12> Send a Monarch to Mexico! [More Like This]
URL: http: //www.gi.net/NET/PM-1996/96-09/96-09-27/0045.html
Summary: Joined by a fragile butterfly, shared hope will. Journey North program will be featured, including beautiful footage.
91% Journey North [More Like This]
URL: http://www.whro-pbs.org/LearningLink/monarchs.html
Summary: Sometime next March, when the real monarchs' departure from Mexico is announced, the paper butterflies will return to North America. What materials are needed to make sure your monarch survives its journey south, the winter months in Mexico, and its journey north next spring?
91% Untitled [More Like This]
URL: http://www.bell-atl.com/wschool/html/announce/oct/oct2096.htm
Summary: The postage must be sufficient to mail the butterflies back to you from the Journey North office in the U.S. (The monarchs will not be mailed from Mexico, so either U.S. or Canadian postage is fine. Urqhuart tagged the first monarchs 59 years ago--and graciously agreed to tag the first paper monarchs for this symbolic migration!
Check out our advertiser: Click Here ---
Excite Search found 926 documents about:
What:Where: [Help]
[Advanced Search]
Super-charge your browser with Excite Direct. Click here!
-1996 Excite Inc.
Disclaimer
Search Menu
New Search
Advanced Search
Add URL
Excite and AOL Sign Exclusive Agreement
Check out our advertiser: A Chance to Win a Free Kodak DC25 Camera
Excite Search found 926 documents about: Monarch AND (butterflies OR spend) AND (winter)).
Check out Reviews!
Arts
Business
Computing
Education
Entertainment
Health
Hobbies
Life & Style
Money
News
Personal Pages
Politics & Law
Regional
Science
Shopping
Sports ---
Did You Know?
Search results are sorted by relevance, indicated by a percentage rating. Click 'Sort by Site' to see which websites have the most documents.

---
Go To
Excite Home
Excite Search
Excite Reviews
Excite City.Net
Excite Live
Excite Reference
Excite Tours
Info
Help
Feedback
Advertising
Credits
About Excite ---
Did you know?
Click on 'More Like This' to see more documents that pertain to your search.

---
Excite Search is sponsored in part by Sun Microsystems and run on 10-CPU Ultra Enterprise 4000 servers.

---
Documents 11–20 sorted by confidence
91% Monarch Population Plummets in Mexico [More Like This]
URL: http://www.isit.com/butterfly/articles/sendmon.htm
Summary: Urqhuart tagged the first monarchs 59 years ago--and graciously agreed to tag the first paper monarchs for this symbolic migration! All migratory monarchs east of the Rocky Mountains spend the winter in just 9 major sanctuaries in Mexico!
91% Monarch Population Plummets in Mexico [More Like This]
URL: http://mgfx.com/butterfly/articles/sendmon.htm
Summary: Or feel free to follow one of the designs found on Journey North's WWW site at: http://www. Mail your butterflies in a large manila envelope to: Journey North, 125 North First Street , Minneapolis, Minnesota 55401 USA.
90% Journey North program will be featured . . . [More Like This]
URL: http://archives.gsn.org/oct96/0042.html
Summary: http://www.freaknet.co.il:80/wwwboard/messages/147.html
90% Web gives students front-row seats for b . . . [More Like This]
URL: http://www.dispatch.com/news/newsfeatures/butterflies1112.html
Summary: Dispatch Schools Reporter November 12, 1996 Students in Tine Gehres' science classes at Wedgewood Middle School watched the summer slip away to Mexico on the wings of thousands of monarch butterflies. They reported their sightings each day to the Journey North site on the World Wide Web. That way, Gehres said, students everywhere could plot sightings on a map and track the southward.
90% ZooNews - 12 July 96 [More Like This]
URL: http://www.cpb.uokhsc.edu/OKC/OKCZoo/zn/
ZooNew960912a.html
Summary: The Monarch butterfly, also known as the milkweed butterfly, is one of the world's most widely distributed butterflies and is one of only a few that migrate north and south like birds do for the winter. Monarchs that hatch and develop in the fall live longer and behave differently than those hatched earlier in the year.
90% Riley said the insects respond to the s . . . [More Like This]
URL: http://www.agctr.lsu.edu/wwwac/4nws1017.txt
Summary: http://cedar.ag.uiuc.edu:8001/CropSci/weed-1ab/Bill/Bill.htm
90% Pismo Beach Guide - Monarch Butterflies [More Like This]
URL: http://webmill.com/pismo/monarch
Summary: The Butterflies will form dense clusters on the trees, each

APPENDIX G animal hanging with its wings down over the one below it to form a shingle effect, that gives some shelter from the rain and warmth for the group. If a Butterfly is dislodged it may fall victim to inserts or field mice, since it cannot fly at temperatures much lower than 55 degrees, and at a temperature lower than 40 degrees, it is.

90% "The Wanderer" [More Like This]
URL: http://www.adventure.com/library/encyclopedia/bug/rfimnarc.html
Summary: In another few weeks, more Monarchs mature from eggs that were laid in other places on milkweed; they also start northward. Migrating swarms of Monarchs may number in the tens of thousands and there have been years when flocks have been estimated to contain millions.

90% Monarch Butterfly Migration [More Like This]
URL: http://genbiol.cbs.umn.edu/1009/1009h/monarchs.html
Summary: Traveling in a southwesterly direction, the monarchs fly east of the Great Lakes and south-southwest in areas west of the Great Lakes. Presently, three sights along Ontario's great lakes have been designated as butterfly reserves.

90% THE MONARCH BUTTERFLY SANCTUARY, NATURAL . . . [More Like This]
URL: http://www.mexico-travel.com/states/s16/132zz1.htm
Summary: Urquhart put tags on the wings of some butterflies, and followed their trails to Mexican territory, always motivated by the question: Where do they spend the winter? However, the Monarch has an important defense mechanism: they are toxic, and when eaten by birds, they accelerate their cardiac rhythms causing death.

Check out our advertiser: A Chance to Win a Free Kodak DC25 Camera
----------------------------------------------------------------
Excite Search found 926 documents about:
What:Where: [Help]
[Advanced Search]
Super-charge your browser with Excite Direct. Click here!
- 1996 Excite Inc.
Disclaimer
Lycos Search results:

Click on graphic to visit site.
You searched all sites for:
You found 22 relevant documents from a total of 68173788 indexed Web pages: monarch , butterflies, spend , spending , winter, . . .
1) More Monarch Magic -- Does God Exist? [100%, 3 of 4 terms]
2) Snowstorm! [93%, 3 of 4 terms]
3) gopher://gopher.informns.k12.mn.us/00/best-k12/monarchs/%20Introducing-Monarch [87%, 3 of 4 terms]
4) Map the Monarchs! [86%, 3 of 4 terms]
5) 'Netting Butterflies [86%, 3 of 4 terms]
6) gopher://gopher.irformns.k12.mn.us/00/best-k12/monarchs/%20%20Map%20The%20Mona [85%, 3 of 4 terms]
7) NHAS 10/94 [85%, 3 of 4 terms]
8) Newsletter Article (October, 1995): Fall Insects [84%, 3 of 4 terms]
9) MISC> Journey North [84%, 3 of 4 terms]
10) The Miracle of Migration [84%, 3 of 4 terms]
11) Thirty Great Ideas for Family Fun In Santa Cruz County [83%, 3 of 4 terms]
12) Thirty Great Ideas for Family Fun [83%, 3 of 4 terms]
13) Novae Group Discussion Archive: 03-17-96 NOVAE GROUP Monday's Posting [82%, 3 of 4 terms]
14) Endangered Species Images from Optilearn [79%, 3 of 4 terms]
15) Endangered Species Images from Optilearn [79%, 3 of 4 terms]
16) Regional Alliance Education Reform Network: Eisenhower Nat'l Clearinghouse onl [79%, 3 of 4 terms]
17) Novae Group Discussion Archive: 02-11-3-4 NOVAE GROUP posting 3 out of 4 [79%, 3 of 4 terms]
18) OMIX Marketspace Directory [73%, 3 of 4 terms]
19) Nation World [73%, 3 of 4 terms]
20) ITSS Digest [73%, 3 of 4 terms]
----------------------------------------------------------------
Previous Page Next Page
Jump down the list: 1 á.á2
Previous 10 Pages Next 10 Pages
Edit your search:
Match all words Match any word
----------------------------------------------------------------
Click on graphic to visit site.
New Search . TopNews . Sites by Subject . Top 5% Sites . City Guide . Pictures & Sounds
PeopleFind . Point Review . Road Maps . Software . About Lycos . Club Lycos . Help
Add Your Site to Lycos . Lycos Merchandise
Copyright - 1996 Lycostm, Inc. All Rights Reserved.
Questions & Comments
;

Appendix H

| | |
|---|---|
| av01: | http://www.oit.itd.umich.edu/bio/doc.cgi/Arthropoda/Insecta/Lepidoptera/Nymphalidae/*Danaus_plexippus*.ftl |
| av02: | http://dnr.state.il.us/NREDU/CLASSRM/symbol/insect.htm |
| av03: | http://www.portland.net/ph/monews/story2.htm |
| av04: | http://monarch.bio.ukans.edu/parasitecontrol |
| av05: | http://www.blake.pvt.k12.mn.us/campus/projects/upper/monarchs/research/steiner1.html |
| av06: | http: //www.ties.k12.mn.us/~jnorth/critters/monarch/829680914.html |
| av07: | http://www.ties.k12.mn.us/~jnorth/critters/monarch/829061947.html |
| av08: | http://www.ties.k12.mn.us/~jnorth/critters/monarch/827853714.html |
| av09: | http://bvsd.k12.co.us/monarch.html |
| av10: | http://www.ties.k12.mn.us/~jnorth/critters/monarch/826042770.html |
| av11: | http://monarch.bio.ukans.edu/migrtnhist.html |
| av12: | http://www.blake.pvt.k12.mn.us/campus/projects/upper/monarchs/reports/report8.html |
| av13: | http://info.csd.org:70/WWW/schools/pattonville/insect.museum/butterfly.html |
| av14: | http://genbiol.cbs.umn.edu/1009/1009h/monarchs.html |
| av15: | http://dial.net/pismo/monarch |
| av16: | http://webmill.com/pismo/monarch |
| av17: | http://www.deepriver.com/adven/htm/181.htm |
| av18: | http://monarch.bio.ukans.edu/migration.html |
| avl9: | http://monarch.bio.ukans.edu/texasmw.html |
| ly01: | http://www.doesgodexist.org/JanFeb96/Monarch.html |
| ly02: | http://monarch.bio.ukans.edu/snow.html |
| ly03: | http://www.ed.uiuc.edu/Activity-Structures/Information-Collections/Pooled-Data-Analysis/Map-The-Monarchs.html |
| ly04: | http://riceinfo.rice.edu/armadillo/Ftbend/butterfly.html |

-continued

Appendix H

| | |
|---|---|
| ly05: | http://compstat.wharton.upenn.edu:8001/~siler/newhope/oct.html |
| ly06: | http://www.stolaf.edu/other/snap/nlinsects.html |
| ly07: | http: //www.mid.net/NET/PM-1995/95-02/95-02-16/0017.html |
| ly08: | http://whyfiles.news.wisc.edu/006migration/ |
| ly09: | http://www.steiny.com/sc/cvc/30.html |
| ly10: | http://www.infopoint.com/sc/cvc/30.html |
| ly11: | http://prism.prs.k12.nj.us/WWW/OII/disc-pub/novae-group/0067.html |
| ly12: | http://www.nceet.snre.umich.edu/EndSpp/Optilearn.html |
| ly13: | http://nceet.snre.umich.edu/EndSpp/Optilearn.html |
| ly14: | http://hub.terc.edu/ra/rns/ed-reform/postings/0514.html |
| ly15: | http://prism.prs.k12.nj.us/WWW/OII/disc-pub/novae-group/0023.html |
| ly16: | http://www.sugomusic.com/marketspace_dir/mindex.html |
| ly17: | http://detnews.com/menu/nati1231.htm |
| ly18: | http://www-leland.stanford.edu/group/itss/Org/Digest/Digest_Jan5_96.html |
| ex01: | http://home.forbin.com/~gwinslow/travel.html |
| ex02: | http://www.oise.on.ca/~lasullivan/butterflies.html |
| ex03: | http://www.tnc.org./infield/species/monarch/monarch.htm |
| ex04: | http://www.deepriver.com/adven/htm/181.htm |
| ex05: | http://hermes.ecn.purdue.edu:8001/gopher_dir/The%20Purdue%20Cooperative%20Extension%20Gopher%20Information%20Server/Current%20News/Archives/96/Apr/04–26/OSL:%20Flies%20of%20the%20Butter%20Season |
| ex06: | http://www.museum.state.il.us:70/exhibits/symbols/insect.html |
| ex07: | http://monarch.bio.ukans.edu/ |
| ex08: | http://www.gi.net/NET/PM-1996/96-09/96-09-27/0045.html |
| ex09: | http://www.whro-pbs.org/LearningLink/monarchs.html |
| ex10: | http://www.bell-atl.com/wschool/html/announce/oct/oct2096.htm |
| ex11: | http://www.isit.com/butterfly/articles/sendmon.htm |
| ex12: | http://mgfx.com/butterfly/articles/sendmon.htm |
| ex13: | http://archives.gsn.org/oct96/0042.html |
| ex14: | http://www.dispatch.com/news/newsfeatures/butterflies1112.html |
| ex15: | http://www.cpb.uokhsc.edu/OKC/OKCZoo/zn/ZooNew960912a.html |
| ex16: | http://www.agctr.lsu.edu/wwwac/4nws1017.txt |
| ex17: | http://webmill.com/pismo/monarch |
| ex18: | http://www.adventure.com/library/encyclopedia/bug/rfimnarc.html |
| ex19: | http://genbiol.cbs.umn.edu/1009/1009h/monarchs.html |
| ex20: | http://www.mexico-travel.com/states/s16/132zz1.htm |

Appendix I

| | |
|---|---|
| 1862, 6384 | http://www.ed.uiuc.edu/Activity-Structures/Information-Collections/Pooled-Data-Analysis/Map-The-Monarchs.html<br>Score: 4.50772 |
| 1418, 1468 | http://dnr.state.il.us/NREDU/CLASSRM/symbol/insect.htm<br>Score: 3.3608 |
| 759, 1239 | http://www.museum.state.il.us:70/exhibits/symbols/insect.html<br>Score: 2.03616 |
| 2235, 2491 | http://hermes.ecn.purdue.edu:8001/gopher_dir/The%20Purdue%20Cooperative%20Extension%20Gopher%20Information%20Server/Current%20News/Archives/96/Apr/04–26/OSL:%20Flies%20of%20the%20Butter%20Season<br>Score: 1.50753 |
| 1862, 1972 | http://www.mid.net/NET/PM-1995/95-02/95-02-16/0017.html<br>Score: 1.35457 |
| 8122, 8245 | http://www.oit.itd.umich.edu/bio/doc.cgi/Arthropoda/Insecta/Leidoptera/Nymphalidae/Danaus_plexippus.ftl<br>Score: 1.34016 |
| 729, 801 | http://home.forbin.com/~gwinslow/travel.html<br>Score: 1.20644 |
| 2944, 3086 | http:/monarch.bio.ukans.edu/snow.html<br>Score: 1.03585 |
| 30, 1360 | http://www.deepriver.com/adven/htm/181.htm<br>Score: 0.892374 |
| 6329, 6598 | http://riceinfo.rice.edu/armadillo/Ftbend/butterfly.html<br>Score: 0.882793 |
| 39,645 | http://www.blake.pvt.k12.mn.us/campus/projects/upper/monarchs/research/steiner1.html<br>Score: 0.851319 |
| 876, 1326 | http://www.oise.on.ca/~lasullivan/butterflies.html<br>Score: 0.460421 |
| 331, 510 | http://www.stolaf.edu/other/snap/nlinsects.html<br>Score: 0.46026 |
| 324, 1225 | http://www.doesgodexist.org/JanFeb96/Monarch.html<br>Score: 0.258716 |

Appendix I

| | |
|---|---|
| 3469,3636 | http://www.ties.k12.mn.us/~jnorth/critters/monarch/829061947.html<br>Score: 0.224219 |
| 32,429 | http://monarch.bio.ukans.edu/parasitecontrol<br>Score: 0.151446 |
| 3031, 3840 | http://www.ties.k12.mn.us/~jnorth/critters/monarch/829680914.html<br>Score: 0.0425499 |

Appendix J

STATE INSECT - MONARCH BUTTERFLY *Danaus plexippus*
The monarch was chosen in 1975 to be Illinois' state insect. The third grade classes at Dennis School in Decatur originally recommended the species.
The monarch undergoes four changes in form (metamorphoses) during its lifetime. It begins as a tiny egg. In its second stage it becomes a black, yellow and white striped caterpillar (larva). During this stage, the monarch caterpillar sheds its skin (molts) up to four times as it grows to its full length of about 2 inches. The monarch larva feeds only on the milkweed plant. Luckily for the larvae, the juices of the milkweed make the larvae taste terrible to birds and they rarely get eaten. In the third stage, the monarch forms a protective covering called a chrysalis (pupa). This pupa is shiny and green with gold speckles. During this time the monarch undergoes its final change. When it emerges from its sac, out comes a beautiful black and orange monarch butterfly. This entire process takes about a month. There are usually three to four generations of monarchs produced each year.
While most insects hibernate, the monarch is the only species of butterfly which actually flies to warmer weather (migrates) in winter. Monarchs from Illinois spend their winters in California and Mexico. In the fall, people have reported seeing entire trees covered with thousands of migrating monarchs! However, only about 1 percent of these monarchs actually survive the journey back to Illinois.
-----------------------------------------------------
Back
Almost America's national butterfly,
the flamboyant Monarch is among the best-known butterflies.
Burnt orange, up to 4 inches across with black
markings, Monarchs can be found virtually anywhere in the United States.
Besides making the Monarch beautiful to watch, its orange color serves
another purpose. Butterfly wings display an array of disguises to
confuse predators. One of the most effective defenses, demonstrated so
famously by the monarch, is the display of bright colors to signify
distastefulness. Monarchs favor nectar from the poisonous milkweek
plant. That makes monarchs untasty, and birds learn this early on,
avoiding monarchs and other butterflies (such as viceroys) that look
like them.
The Monarch is the only butterfly that annually migrates both north and
south. In late September, for instance, they begin to congregate at
Cache River Joint Wetlands Project in Illinois, a Conservancy preserve,
and move southward for their annual migration.
By October, they've flown hundreds of miles.
Millions of Monarch butterflies return to their
winter habitat in Mexico via the Devils River Corridor, which flows
through the heart of Dolan Ranch Preserve in Texas. Monarchs continue
south to the Sierra Madre of Mexico, where they spend the winter. By
January, the Mexican fir trees and mountainsides are full of Monarchs,
drifting, gliding, fluttering and basking.
But no individual makes the entire round-trip journey. As they head
north in spring, Monarchs breed along the way and their offspring return
to the starting point. Still the Monarch is among the longest-lived
butterflies, lasting about 10 months between chrysalis and the day it
dies.
Photo Credits
Monarch Butterfly (c) Terry Cook
Copyright - 1996, The Nature Conservancy.

APPENDIX K

Result #2

Ranking: 3.3608
From: dnr.state.il.us
Found with: Alta Vista
While most insects hibernate, the monarch is the only species of butterfly which actually flies to warmer weather (migrates) in winter. Monarchs from Illinois spend their winters in California and Mexico. In the fall, people have reported seeing entire trees covered with thousands of migrating monarchs! However, only about 1 percent of these monarchs actually survive the journey back to Illinois.
Result #3

Ranking: 2.47543
From: www.tnc.org.
Found with: Excite
The Monarch is the only butterfly that annually migrates both north and south. In late September, for instance, they begin to congregate at Cache River Joint Wetlands Project in Illinois, a Conservancy preserve, and move southward for their annual migration. By October, they've flown hundreds of miles. Millions of Monarch butterflies return to their winter habitat in Mexico via the Devils River Corridor, which flows through the heart of Dolan Ranch Preserve in Texas. Monarchs continue south to the Sierra Madre of Mexico, where they spend the winter. By January, the Mexican fir trees and mountainsides are full of Monarchs, drifting, gliding, fluttering and basking.

We claim:

1. A method of locating information in at least one information source using at least one search engine, comprising the steps of:

(i) accepting a natural language query describing desired information;

(ii) parsing said natural language query to extract terms relevant to said desired information;

(iii) creating search data comprising at least two search candidates from said extracted terms in a form appropriate to each of said at least one search engine, and transferring said created search data to said each of said at least one search engine to initiating a search;

(iv) receiving search results comprising at least one list of information sources from said each of said at least one search engine, and removing redundancies from said at least one list of information sources to obtain a reduced list of information sources;

(v) retrieving complete copies of each information source in said reduced list;

(vi) examining each said retrieved complete copy relative to said at least two search candidates to determine a match ranking therefor by:

(a) arranging each said complete copy into segments, each segment defining the contents of said document between at least three consecutive matches between said complete copy and any of said at least two search candidates;

(b) examining each segment in said complete copy to determine a segment score comprising a score for each match between the contents of said complete copy and each search candidate, and weighting said segment score with respect to the length of said segment;

(c) selecting at least two segments of said complete copy with the highest weighted segment scores from step (b);

(d) for each selected segment, augmenting the segment to include the contents of said complete copy between the selected segment and an adjacent match and performing step (b) for each augmented segment to obtain an updated segment score;

(e) while said updated segment score for an augmented segment is greater than said segment store, performing step (d);

(f) selecting said augmented segment with the highest updated segment score from each said complete copy; and (g) ranking the selected augmented segments for each said complete copy according to said updated segment scores;

(vii) selecting at least the highest ranked selected augmented segment for display to the user, and editing each said at least highest ranked selected segment to form a complete segment by examining the beginning and end of said segment and adding or removing adjacent content of said complete copy to form a substantially grammatically correct segment; and (viii) providing said each said substantially grammatically correct segment to said user.

2. The method as defined in claim 1 wherein step (vii) further comprises the step of removing predefined formatting information from said segment.

3. The method as claimed in claim 2 wherein said formatting information comprises HTML tags.

4. The method of claim 1 wherein step (vii), said complete segments comprise at least one complete sentence.

5. The method of claim 1 where in step (vii), said complete segments comprise at least one complete paragraph.

6. The method of claim 1 wherein said at least one information source comprises an HTML formatted document.

7. The method of claim 6 wherein said at least one information source is accessible via a telecommunications network.

8. The method of claim 7 wherein said at least one search engine is accessible via a telecommunications network.

9. The method of claim 6 wherein at least first and second retrieved complete copies are obtained, said first complete retrieved copy being obtained from a first location connected to said telecommunications network and said second complete retrieved copy being obtained from a second location connected to said telecommunications network.

10. The method of claim 6 wherein at least first and second search engines are employed, said first search engine being located at a first location connected to said telecommunications network and said second search engine being located at a second location connected to said telecommunications network.

11. The method of claim 6 wherein said at least one information source is located on a computer network.

12. The method of claim 11, further comprising a plurality of information sources, each information source being located on said computer network.

13. The method of claim 11 wherein said at least one search engine is located on said computer network.

* * * * *